United States Patent
Senkal et al.

(10) Patent No.: US 10,247,554 B2
(45) Date of Patent: Apr. 2, 2019

(54) FULLY BALANCED MICRO-MACHINED INERTIAL SENSOR

(71) Applicant: The Regents of the University of California, Oakland, CA (US)

(72) Inventors: Doruk Senkal, Irvine, CA (US); Sergei A. Zotov, Irvine, CA (US); Andrei M. Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 540 days.

(21) Appl. No.: 14/863,172

(22) Filed: Sep. 23, 2015

(65) Prior Publication Data

US 2016/0084654 A1   Mar. 24, 2016

Related U.S. Application Data

(60) Provisional application No. 62/054,878, filed on Sep. 24, 2014.

(51) Int. Cl.
   *G01C 19/5747*   (2012.01)
   *G01C 19/5726*   (2012.01)

(52) U.S. Cl.
   CPC ..... *G01C 19/5747* (2013.01); *G01C 19/5726* (2013.01)

(58) Field of Classification Search
   CPC ............ G01C 19/5747; G01C 19/5726; G01C 19/5755
   See application file for complete search history.

(56) References Cited

U.S. PATENT DOCUMENTS

| | | | | |
|---|---|---|---|---|
| 5,025,346 A * | 6/1991 | Tang | ..... | B81B 3/0021 361/283.1 |
| 5,226,321 A * | 7/1993 | Varnham | ..... | G01C 19/5684 73/504.13 |
| 5,616,864 A * | 4/1997 | Johnson | ..... | G01C 19/5684 73/504.04 |
| 5,955,668 A * | 9/1999 | Hsu | ..... | G01C 19/5719 73/1.37 |
| 6,250,157 B1 * | 6/2001 | Touge | ..... | G01C 19/5719 73/504.12 |
| 7,100,446 B1 * | 9/2006 | Acar | ..... | G01C 19/5719 73/504.12 |
| 7,260,991 B2 * | 8/2007 | Maurer | ..... | G01C 19/5712 73/504.08 |
| 8,689,631 B1 * | 4/2014 | Tally | ..... | G01C 19/5762 73/504.12 |
| 8,789,416 B2 * | 7/2014 | Rocchi | ..... | G01C 19/574 73/504.04 |

(Continued)

FOREIGN PATENT DOCUMENTS

EP   2573516 A1 *   3/2013   ......... G01C 19/5712

*Primary Examiner* — Daniel S Larkin
*Assistant Examiner* — Anthony W Megna Fuentes
(74) *Attorney, Agent, or Firm* — Marcus C. Dawes; Daniel L. Dawes

(57) ABSTRACT

The improvement includes an outer proof mass having a corresponding center of mass; and an inner proof mass having a corresponding center of mass, where the corresponding centers of mass of the outer proof mass and the inner proof mass are approximately co-located. Thus, a double Foucault pendulum is essentially provided in a micromachined gyroscope.

12 Claims, 25 Drawing Sheets

(56) References Cited

U.S. PATENT DOCUMENTS

| | | | |
|---|---|---|---|
| 8,803,624 B2* | 8/2014 | Phan Le | H03H 9/2431 331/116 M |
| 9,097,524 B2* | 8/2015 | Seeger | G01C 19/5733 |
| 2004/0112134 A1* | 6/2004 | Beitia | G01C 19/5684 73/504.12 |
| 2004/0144174 A1* | 7/2004 | Fell | G01C 19/5684 73/504.12 |
| 2004/0211257 A1* | 10/2004 | Geen | G01C 19/5712 73/504.04 |
| 2006/0009295 A1* | 1/2006 | Song | F16D 3/12 464/66.1 |
| 2010/0058861 A1* | 3/2010 | Kuang | G01C 19/5677 73/504.12 |
| 2010/0295138 A1* | 11/2010 | Montanya Silvestre | B81C 1/00246 257/415 |
| 2011/0061460 A1* | 3/2011 | Seeger | G01C 19/5719 73/504.12 |
| 2012/0006113 A1* | 1/2012 | Zolfagharkhani | G01C 19/5755 73/504.12 |
| 2013/0167636 A1* | 7/2013 | Coronato | G01C 19/42 73/504.12 |
| 2014/0224016 A1* | 8/2014 | Leclerc | G01C 19/5712 73/504.12 |
| 2015/0211854 A1* | 7/2015 | Ruohio | G01C 19/5712 73/504.12 |

* cited by examiner

FULLY BALANCED MICRO-MACHINED INERTIAL SENSOR

RELATED APPLICATIONS

This application is related to provisional patent application, entitled, "FULLY BALANCED MICRO-MACHINED INERTIAL SENSOR", Ser. No. 62/054,878, filed on Sep. 24, 2014, under 35 USC 119, which is incorporated herein by reference.

BACKGROUND

1. Field of the Technology

The invention relates to the field of micromachined gyroscopes, namely a dynamically balanced Coriolis Vibratory Gyroscope design to minimize anchor losses within the gyroscope mechanical element.

2. Description of the Prior Art

Coriolis vibratory gyroscopes (CVGs) can be divided into two broad categories based on the gyroscope's mechanical element: 1) degenerate mode gyroscopes which have x-y symmetry (Δf of 0 Hz for a z-axis gyro) and 2) non-degenerate mode gyroscopes which are designed intentionally to be asymmetric in x and y modes (Δf of 10 to 100 Hz for a z-axis gyro). Quality factor of the resonator is one of the key parameters for high performance CVG operation as it directly affects factors such as thermomechanical noise, electronics (forcer) induced sensor drift and power consumption. For these reasons it is important to maximize the Q-factor for degenerate mode CVGs. Total Q-factor of the vibratory structure can be calculated from contribution of individual dissipation mechanisms in a manner analogous to solving a parallel resistor network. For this reason the total Q-factor is dominated by the dissipation mechanism with the lowest Q-factor (weakest link).

$$Q^{-1}_{total} = Q^{-1}_{visc} + Q^{-1}_{anchor} + Q^{-1}_{mat} + Q^{-1}_{surf} + Q^{-1}_{etc};$$   i.

In order to optimize the Q-factor all loss mechanisms affecting the system need to be individually addressed:

Anchor losses, Qanchor, are caused by acoustic losses into the substrate and are minimized by decoupling the resonator and the substrate by using a dynamically balanced resonator structure.

Viscous damping, Qvisc, is the most dominant affect with Q-factor of several thousands at atmospheric conditions. However, it can easily be eliminated by operating the device in moderate to high vacuum.

Material losses, Qmat, can be divided into several individual loss mechanisms. Thermoelastic dissipation is caused by an interaction between the thermal fluctuations and mechanical oscillations. Additional material losses are caused by microscopic effects, such as presence of foreign materials within the matrix of the resonator material and lattice defects at grain boundaries.

Additional loss mechanisms, Qetc, such as Akheiser dissipation have typically very high Q-factors at kHz range and are not taken into account.

High performance MEMS Coriolis Vibratory Gyroscopes are typically packaged under vacuum such that viscous dissipation is not significant. Material losses such as thermoelastic dissipation can be minimized by using an optimized design. Anchor losses can be minimized by using a dynamically balanced design such that the resonator element is both momentum and force balanced. A moment and force balanced mechanical element leaks minimal amount of vibrational energy into the substrate, resulting in higher Q-factors.

A simple coriolis vibratory gyroscope may consist of a single proof mass that is free to vibrate on two axis (x and y), creating a two degrees of freedom oscillator. Typically gyroscope is driven into resonance along one axis (drive axis) and the vibrations along the other axis are measured (sense axis). Rotation along z axis transfers vibratory energy from drive axis onto sense axis, via coriolis forces, such that the vibration amplitude along sense axis is proportional to rotation velocity. Sensing these vibrations on the sense axis through capacitive, optical or electrostatic means allows one to measure angular velocity.

Proof masses on conventionally micro-machined gyroscopes are anchored to a substrate via flexural beams or springs. Vibration along any axis creates a load on the springs due to displacement of the proof mass. F=kx where F is the force, k is the spring constant and x is the displacement amplitude (a bolded variable is a vector quantity). Due to the Newton's Third Law of Motion ("For every action there is an equal and opposite reaction."), the force exerted on the springs by the proof mass is accompanied by an equal and opposite force exerted by the substrate onto the spring. This force is typically of sinusoidal nature due to the vibratory motion and creates an acoustic energy loss into the substrate. This is typically the primary energy loss mechanism for single proof mass Coriolis Vibratory Gyroscopes, limiting the maximum achievable Q factor. This is called an anchor loss.

In order to address anchor losses, various researchers proposed tuning fork Coriolis Vibratory Gyroscope architectures. In tuning fork architectures two equal proof masses are used as the resonator vibratory element. In this architecture, both proof masses are excited simultaneously. The vibratory motion of the proof masses are typically in anti-phase, such that the moment created by vibratory motion on each proof mass is equal and opposite in direction:

$F_1 = m_1 a_1, F_2 = m_2 a_2$ and   i.

$F_1 = -F_2$ or $F_1 + F_2 = 0$.   ii.

Due to the opposite momentum vectors of the two proof masses, vibrations along x axis are balanced. This causes the net force transmitted to the substrate along x axis to be zero. Net torque transmitted to substrate due to vibration along x axis is zero, as the center of masses of the proof masses lie on the x axis. This results in significant reduction in anchor losses and large Q-factor along x axis.

However, y mode is not balanced. The net force along y-axis is still zero, due to equal and opposite motion of the proof masses. However there is a finite, nonzero distance between the centers of mass of the two proof masses. This creates a torque along the center of mass of the combined system, because the motion along y axis is force balanced but not torque balanced due to the opposite vectors and a non-zero moment arm between each proof mass and center of mass of the system.

$T = F_1 \times d/2 + F_2 \times d/2 \neq 0$ where d is the distance between the centers of mass of the two equal proof masses. Because of this, vibration along y axis is susceptible to anchor losses and the y mode typically exhibits lower Q-factors.

BRIEF SUMMARY

The illustrated embodiments of the invention include an improvement in a vibratory structure gyroscope. The improvement includes an outer proof mass having a corresponding center of mass; and an inner proof mass having a corresponding center of mass, where the corresponding centers of mass of the outer proof mass and the inner proof mass are approximately co-located. Thus, a double Foucault pendulum is essentially provided in a micromachined gyroscope.

The improvement includes the configuration where the inner proof mass is nested within the outer proof mass.

In one embodiment the inner proof mass is in the shape of a rectangular prism or square and the outer proof mass is in the shape of a frame around the inner proof mass.

In another embodiment the inner proof mass is in the shape of a disk and outer mask is in the shape of a ring.

In yet another embodiment both the inner proof mass and outer proof mass are in the shape of a frame.

In still another embodiment both the inner and outer proof masses are in the shape of rings, or an outer ring and an inner disk.

In an embodiment the inner and outer proof masses are in the shape of multiple concentric rings coupled to each other through spokes.

The improvement further includes actuators which vibrate the inner and outer proof masses in anti-phase translational motion.

The improvement further includes actuators which vibrate the inner and outer proof masses in a higher order Wineglass or Lame mode.

The improvement further includes actuators, such comb drives and parallel plate drives which vibrate the two proof masses in synchronicity.

The improvement further includes a plurality of flexural connections between inner and outer proof masses and the synchronization of the vibratory motion is accomplished by the flexural connection between inner and outer proof masses. The drive force applied to inner and outer proof masses is in synch. However, this is typically not enough to synchronize inner and outer proof masses, due to fabrication imperfections. If the inner and outer proof masses are not mechanically coupled, each would have slightly different resonance frequency, which would make electronic synchronization very challenging. Because of this, in addition to the synchronized drive force, the two proof masses are mechanically synchronized in the sense that through a weak spring or flexural connection or other mechanism, vibratory modes of the inner and outer proof masses are coupled with each other, forcing them to move anti-phase (or in-phase) when driven into resonance.

The improvement further includes a circuit to drive the actuators using a closed loop algorithm to drive the inner and outer proof masses in synchronicity, namely the proof masses are vibrated at the same frequency and at a fixed relative phase to each other.

The improvement further includes a circuit and actuators for vibrating the inner and outer proof masses in an anti-phase linear vibratory motion with approximately equal inertial forces, such that the net force generated due to vibratory motion is approximately zero. In other words, the control circuit used to determine the force applied to inner and outer proof masses is of equal amplitude by setting equal amplifier gain to the drive amplifiers coupled to the actuators driving the inner and outer proof masses.

The improvement further includes a circuit and actuators for vibrating the inner and outer proof masses in an in-phase linear vibratory motion such that the net force generated due to vibratory motion is non-zero. In other words, the control circuit used to determine the force applied to inner and outer proof masses is of not equal in amplitude as a result of setting unequal amplifier gains to the drive amplifiers coupled to the actuators driving the inner and outer proof masses.

The improvement further includes a circuit and actuators for vibrating the inner and outer proof masses in an anti-phase torsional vibratory motion with approximately equal rotational inertia, such that the net torque generated due to vibratory motion is approximately zero. In other words, in a gyroscope configure to executed torsional oscillation instead of translational vibration, the rotatable proof masses are driven by their actuators to rotational oscillate instead of translationally vibrate. The control circuit used to determine the force applied to inner and outer proof masses is of equal torque by setting equal amplifier gain to the drive amplifiers coupled to the torsional actuators driving the inner and outer proof masses.

The improvement further includes a circuit and actuators for vibrating the inner and outer proof masses in an in-phase torsional vibratory motion such that the net torque generated due to vibratory motion is non-zero. In other words, in a gyroscope configure to executed torsional oscillation instead of translational vibration, the rotatable proof masses are driven by their actuators to rotational oscillate instead of translationally vibrate. The control circuit used to determine the force applied to inner and outer proof masses is of unequal torque by setting unequal amplifier gains for the drive amplifiers coupled to the torsional actuators driving the inner and outer proof masses.

The improvement further includes a circuit and actuators for sensing linear motion of the inner and outer proof masses along x, y or z axis to measure angular velocity of the gyroscope along x, y or z axis.

The improvement further includes a circuit and actuators for sensing linear motion along x, y or z axis to measure linear acceleration of the gyroscope along x, y or z axis. When the gyroscope is used as an accelerometer, the inner and outer proof masses are not driven by the drive amplifiers, which have an effective zero gain, but by the accelerating environmental force to be measured. Acceleration along x, y or z axis results in translational motion of the proof masses, which in turn results in a net change in capacitance across the pick-off channels. The summing amplifier with positive (+) and negative (−) terminals connected to inner and outer proof masses cancel this effect and as a result device is only sensitive to angular velocity during normal operation: in this case the mechanical system acts as a gyroscope. If the signal from inner and outer proof masses are summed instead of subtracted, the device would be able to measure linear acceleration, in this case an accelerometer is created.

The improvement further includes a circuit and actuators for sensing torsional motion along x, y or z axis of the inner and outer proof masses to measure angular velocity of the gyroscope along x, y or z axis. The same principle as just described in the case of a translational accelerometer applies, but in this case out of plane deformation of the proof masses is detected.

The improvement further includes a circuit and actuators for sensing torsional oscillation along x, y, z axis to generate a timing reference signal. In other words, motion or oscillation is not detected, but the oscillatory resonance of the still gyroscope generates a sine wave output at a fixed frequency that can be used as a clock signal.

In one embodiment the substrate of gyroscope is anchored to the inner proof mass.

In another embodiment the substrate of the gyroscope is anchored from the outer proof mass.

In still another embodiment the substrate of the gyroscope is anchored from both the inner and outer proof masses.

The improvement further includes parallel plate electrodes located on the inner and outer proof masses, which parallel plate electrodes are used to drive and sense the vibratory motion of the inner and outer proof masses through electrostatic transduction.

The improvement further includes comb finger electrodes located on the inner and outer proof masses, which comb finger electrodes are used to drive and sense the vibratory motion through electrostatic transduction.

The improvement further includes electrodes coupled to the inner and outer proof masses and a plurality of shuttles coupled to the inner and outer proof masses for the purpose of decoupling vibratory motion from the electrodes. In other words, forcer and pick-off electrodes, in the form of arrays of parallel plate or comb finger electrodes are mounted onto a rigid body separate from the inner and outer proof masses. This rigid body, called "shuttles", has low stiffness in the direction of intended motion, but has much higher stiffness in any other direction. Because it is only compliant in the direction of intended motion (drive/sense axis), it prevents vibratory motion at any other orientation to be transmitted to and from the forcer and pick-off (drive and sense) electrodes. This unintended vibratory motion is typically caused by fabrication imperfections in the mechanical system such as spring mismatch and/or electrode misalignment.

The improvement further includes a pressure membrane and a mechanical element coupled to the pressure membrane to measure pressure in addition to inertial forces. In this embodiment a pressure membrane is attached to the anchors of the vibratory system. A pressure change results in a change in the applied load to the mechanical element, which in return results in a shift in oscillation frequency.

The improvement further includes a source of current coupled to the mechanical element making the mechanical element sensitive to magnetic fields, changing vibration amplitude, phase or frequency of the inner and outer proof masses in the presence of magnetic fields (Lorentz Force Magnetometer).

Therefore, it can be understood that the embodiments of the invention include an electronic device for measuring inertial force that includes: a processor configured to calculate inertial measurements; a memory coupled to the processor; and a gyroscopic mechanical element comprised of two vibratory parts having a common center of mass and generating inertial information communicated to the processor, and where the center of mass of the two vibratory parts are approximately co-located.

The electronic device further includes a pressure membrane, where the gyroscopic mechanical element is attached to the pressure membrane, generates pressure information communicated to the processor, and where the processor is configured to calculate absolute or gage pressure in addition to inertial measurements.

The electronic device further includes a source of current coupled through the gyroscopic mechanical element, which current makes the gyroscopic mechanical element sensitive to magnetic fields and where the processor is configured to calculate magnetic fields in addition to inertial measurements (Lorentz Force Magnetometer).

The electronic device further includes an absorption/desorption element coupled to the gyroscopic mechanical element, which absorption/desorption element changes the total mass or stiffness of the gyroscopic mechanical element in the presence of a specific chemical/biological substance to measure concentration of a specific chemical/biological substance in the environment.

Therefore, it can be understood that the embodiments of the invention include an electronic device for measuring pressure that includes: a processor configured to calculate pressure forces; a memory coupled to the processor; a gyroscopic sensor having two vibrator parts and providing amplitude, phase or frequency information communicated to the processor, where the two vibratory parts have an approximately matched common center of mass; and a pressure membrane coupled to the gyroscopic sensor that changes the vibration amplitude, phase or frequency of the gyroscopic sensor proportionally to the pressure change.

Therefore, it can be understood that the embodiments of the invention include an electronic device for measuring magnetic fields that includes: a processor configured to calculate magnetic fields; a memory coupled to the processor; a gyroscopic sensor having two vibrator parts and providing amplitude, phase or frequency information communicated to the processor, where the two vibratory parts have an approximately matched common center of mass; and a source of current coupled to the gyroscopic sensor making it sensitive to magnetic fields (Lorentz Force Magnetometer). In other words, if an DC current is applied between at least two anchors of the device at the resonance frequency of the device, the resultant electron flow would create a net force at the resonance frequency, which can be detected through the pick-off electronics.

Therefore, it can be understood that the embodiments of the invention include an electronic device for measuring concentration of chemical or biological substances that includes: a processor configured to calculate an amount of chemical or biological substance in an environment; a memory coupled to the processor, a gyroscopic sensor having two vibrator parts and providing amplitude, phase or frequency information communicated to the processor, where the two vibratory parts have an approximately matched common center of mass; and an absorption/desorption element coupled to the gyroscopic sensor which changes the total mass or stiffness of the gyroscopic sensor when a specific chemical/biological substance is present on or in the absorption/desorption element.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

The illustrated embodiments disclose a balanced Coriolis vibratory gyroscope architecture that is force and torque balanced on both x and y modes. In contrast to tuning fork Coriolis Vibratory Gyroscopes, which are torque balanced only on one axis, this architecture is torque balanced on both axes (modes). As a result anchor losses are minimized not only on one but on two axes, which helps achieve high Q-factor on both modes of the Coriolis Vibratory Gyroscope.

Figure 1:
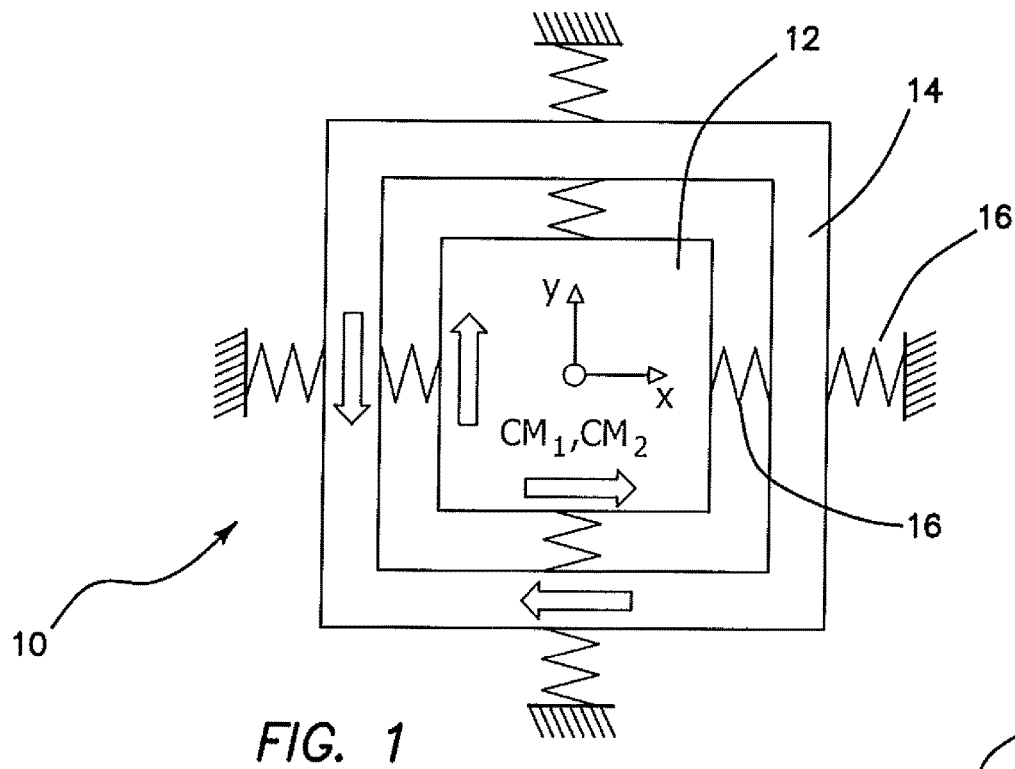
FIG. 1 is a diagram of the architecture of a dual pendulum according to the illustrated embodiments. The device uses two proof masses, such that the center of masses of the two masses coincide or are co-located. This creates a force and torque balanced architecture, minimizing anchor losses and enabling high quality factor on both x and y modes.
Figure 2:
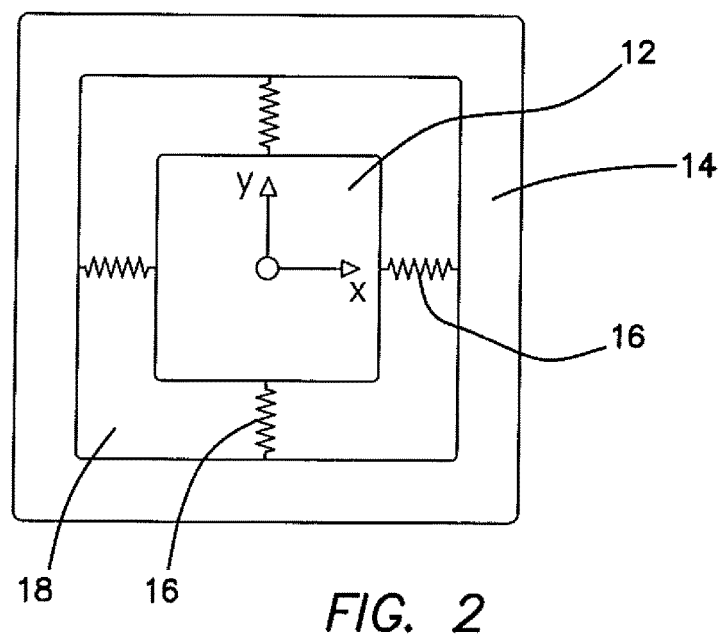
FIG. 2 is a schematic representation of a balanced z-axis gyroscope, where the mechanical element is comprised of a central tine and a frame around it. The frame and the central tine are typically mechanically coupled to each other through flexural elements such as springs. Although, alternative implementations could function without mechanical coupling.
Figure 3A:
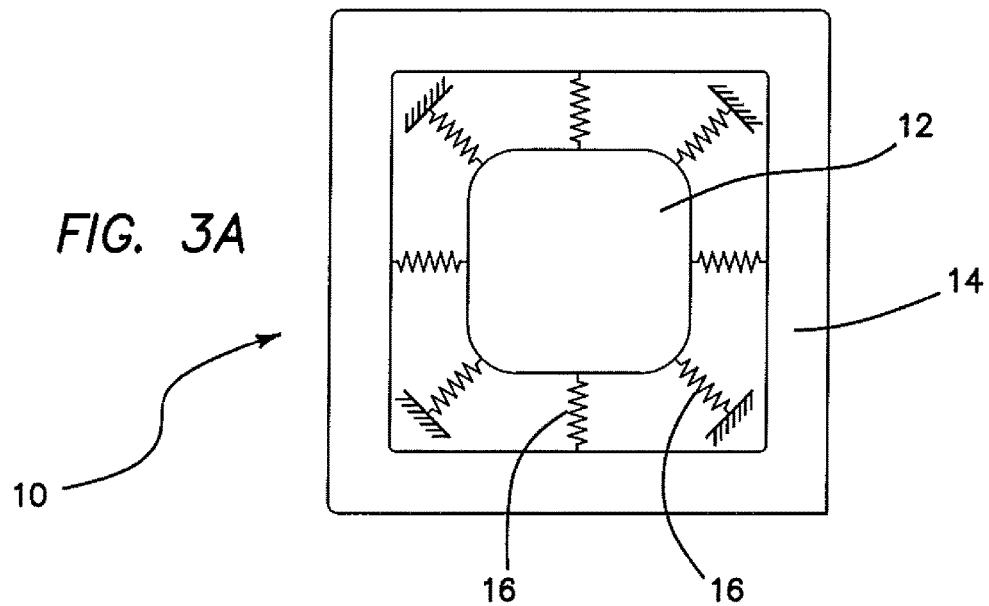
FIGS. 3a-3c are diagrams which show different anchoring configurations for the illustrated gyroscope architecture.
Figure 3B:
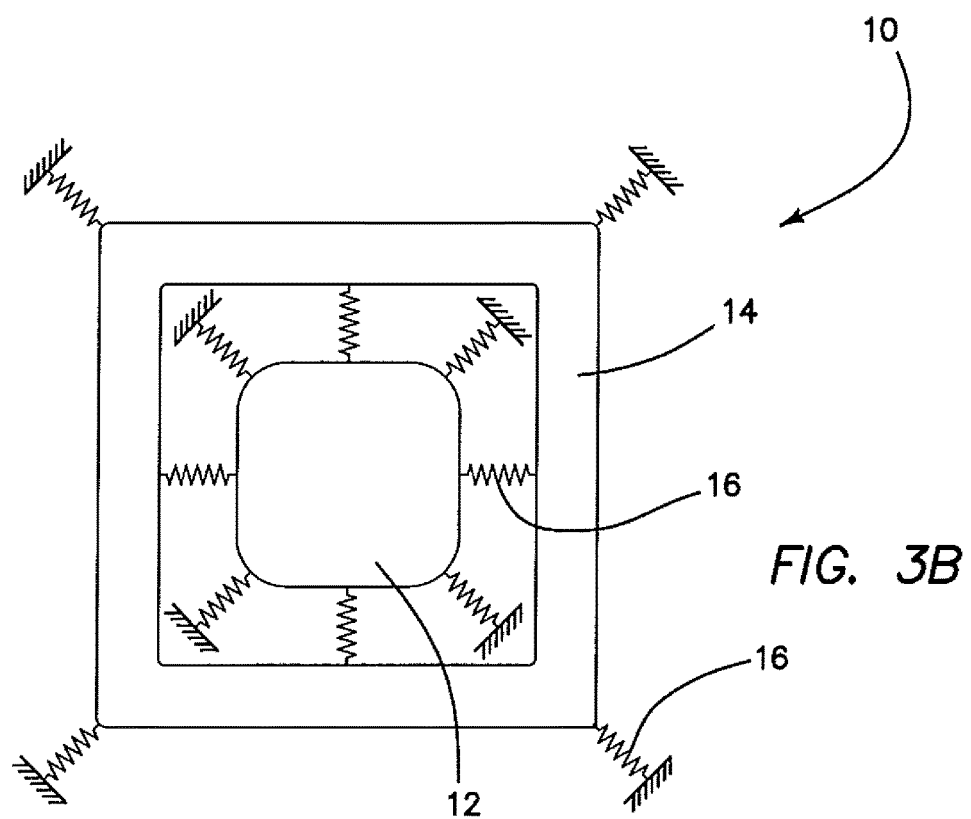
Figure 3C:
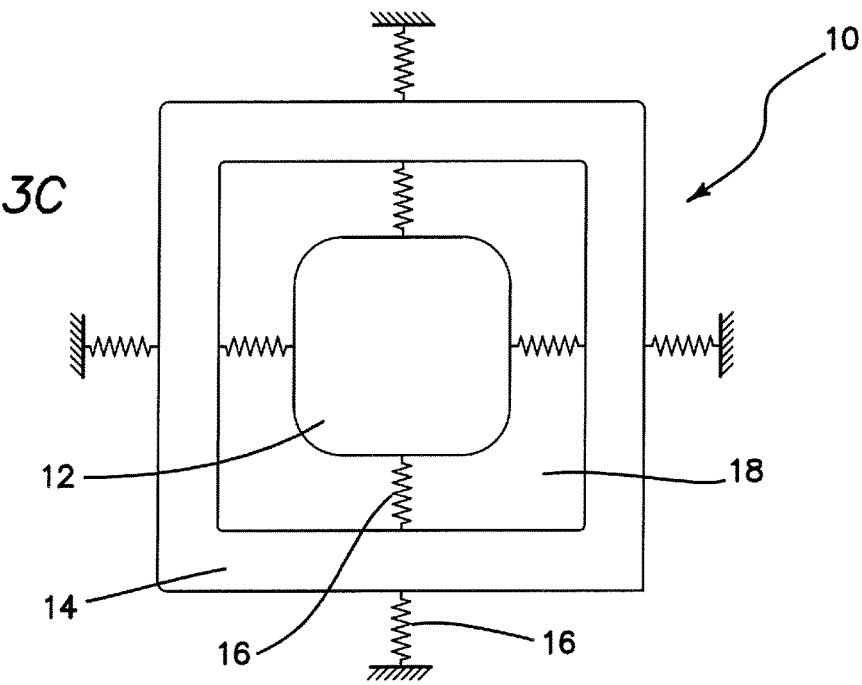

One implementation of such an architecture is a z-axis gyroscope 10 depicted in FIG. 1 where the gyroscope 10 is sensitive to rotation along the out-of-plane z axis. The gyroscope 10 is force and torque balanced as a result anchor losses are minimized not only one but two axes. Which helps achieve high Q-factor on both modes of the Coriolis Vibratory Gyroscope, diagrammatically depicted in FIG. 2. The gyroscopic mechanical element is comprised of two proof masses, a central tine 12 and a frame 14 around it. The frame 14 and the central tine 12 are typically mechanically coupled to each other through flexural elements 16 such as springs, although, certain implementations could possibly function without mechanical coupling. Due to the fact that each proof mass 12, 14 acts as a two-degree-of-freedom pendulum, the gyroscope design can be summarized as a "dual pendulum gyroscope". The dual mass pair 12, 14 can be anchored to the substrate 18 from the inner proof mass 12 as diagrammatically depicted in FIG. 3a, through both the inner and outer proof masses as diagrammatically depicted in FIG. 3b, or from only the outer proof mass as diagrammatically depicted in FIG. 3c. It must be expressly understood that anchoring configurations are not limited to these three examples and other anchoring configurations are also possible.

Figure 4:
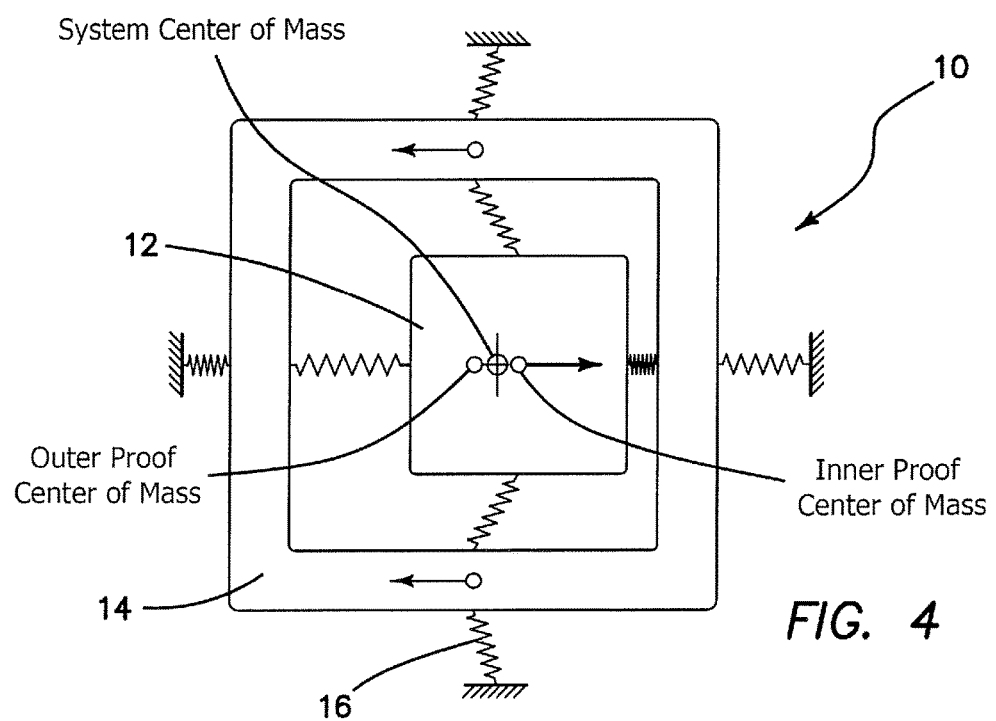
FIG. 4 is a diagram illustrating coupled anti-phase vibratory motion result in complete dynamic balance, nulling the linear and angular momentum of the system.

The primary mode of operation for the z-axis gyroscope 10 is an antiphase vibratory motion between the two proof masses (the frame 14 and the tine 12). The center of masses of the tine 12 and the frame 14 approximately coincide, this provides torque and force balance on both modes, as diagrammatically depicted in FIG. 4. The term, "approximately coincide" mean that the position of the centers of mass of tine 12 and frame 14 are in the same position to a degree that an acceptable Q factor is obtained or the anchor loss is minimized to allow the practical operation of the gyroscope. Generally, this means that the centers of mass of tine 12 and frame 14, when at rest, should be within _____ of each other. This is accomplished by designing the tine 12 and the frame 14 to have yield a net force vector of zero:

$$F_1 = m_1 a_1, F_2 = m_2 a_2 \text{ and}$$

$$F_1 = -F_2 \text{ or } F_1 + F_2 = 0.$$

This can be accomplished by simply designing the tine 12 and the frame 14 to have equal mass and driving them to same amplitude, or it can be accomplished by controlling both the amplitude and the mass such that the equivalent net force is zero. Torque balance is provided by the close to zero distance between the centers of mass of the two proof masses 12, 14, from the result that the moment arm from the center of mass of the system has zero length and consequently gives rise to zero torque. This force and torque balance is present in both x and y axes (modes) of the gyroscope, which helps mitigate anchor losses along any axis, yielding in high Q-factor on both modes.

Figure 5A:
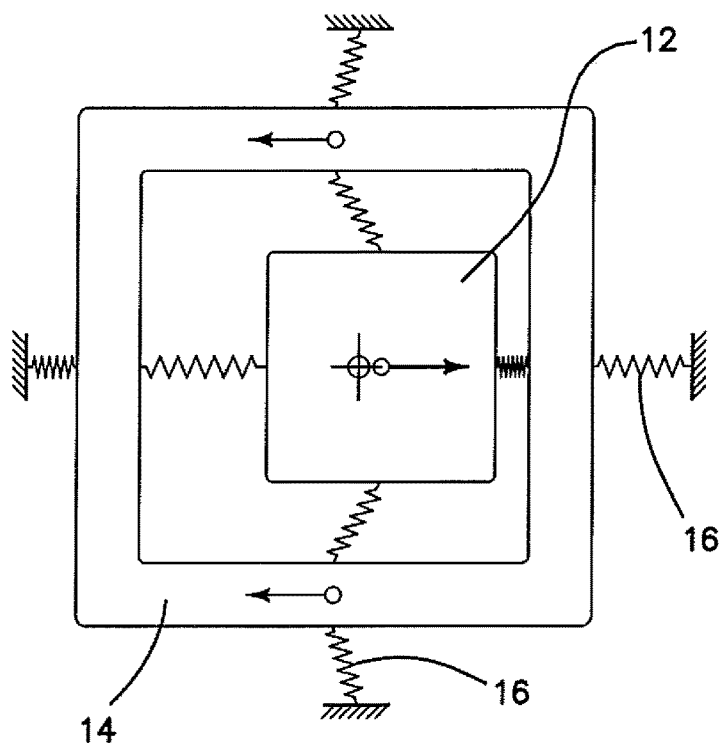
FIGS. 5a and 5b are diagrams which show two vibratory modes of the balanced gyroscope architecture. Anti-phase vibratory motion provides force and torque balance.
Figure 5B:
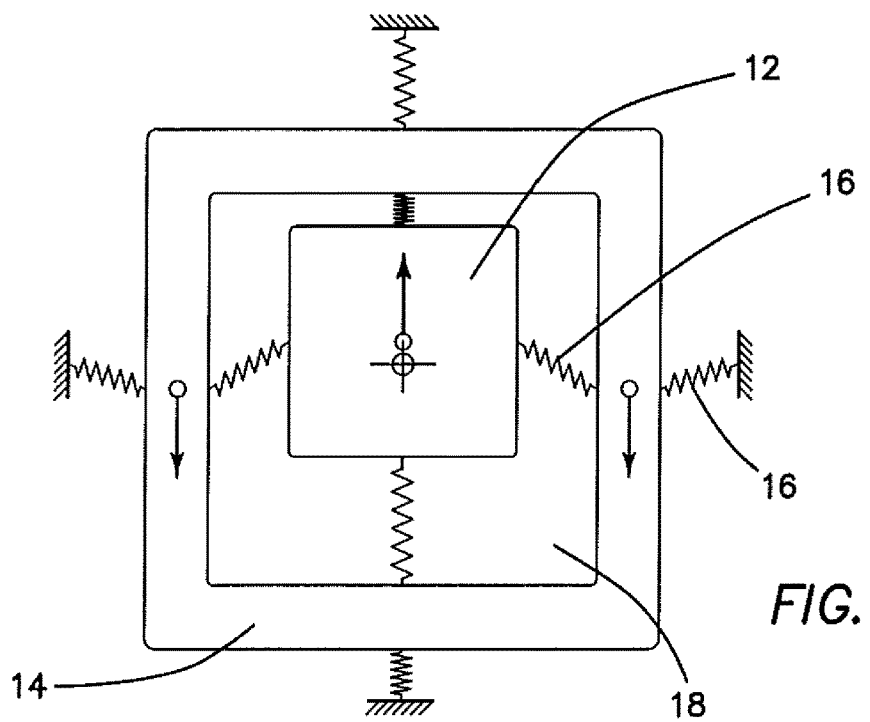

FIGS. 5a and 5b show both vibratory modes of the proposed gyroscope architecture. Vibration energy on each mode is coupled to each other through Coriolis forces, i.e. rotation of the device would transfer energy from one mode to another. By detecting vibratory motion along x and y axis, angular velocity can be measured.

Figure 6:
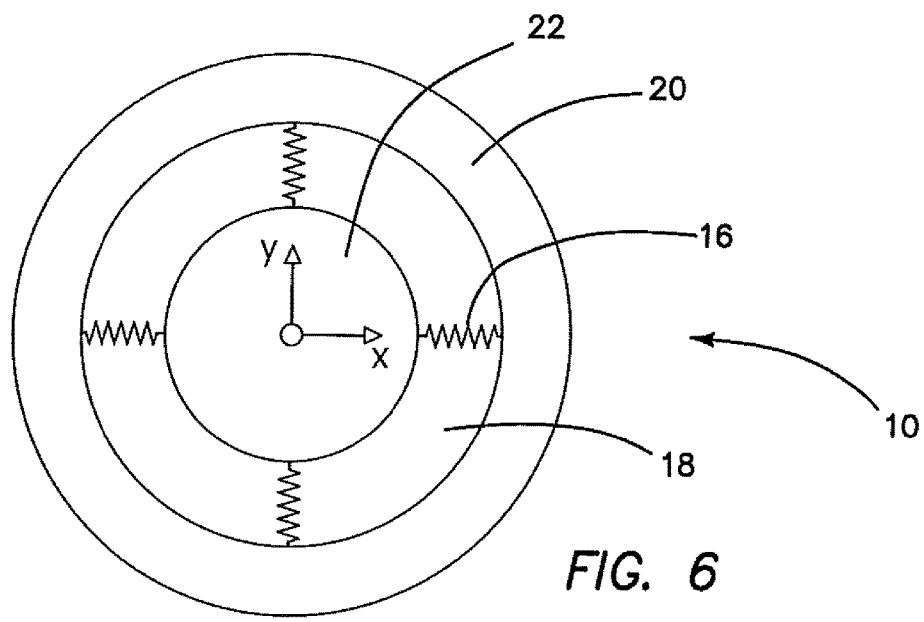
FIG. 6 is a diagram of a dynamically balanced architecture by using other geometries, such as a ring and a disk.

Design of the gyroscope is not limited to only a tine and proof mass pair as shown in FIGS. 1-5b. It is possible to obtain a dynamically balanced architecture by using other geometries, such as a ring 20 and a disk 22 such as shown in FIG. 6. The only requirement for force and torque balance is that center of masses of the two proof masses 12, 14 or 20, 22 approximately coincide so that the net force transmitted to the substrate 18 is zero along any axis: $F_1 = F_2$.

Similarly the gyroscope 10 can be built using any two arbitrary shaped lumped masses, provided that their centers of mass approximately coincide with each other. Examples include, but are not limited to: 1) the tine 12 and a frame 14 of FIG. 4; 2) two concentric frames 14 (not shown); 3) disk 22 and a ring 20 of FIG. 6; 4) two concentric rings 20 (not shown); 5) a triangular tine and a triangular frame, or two concentric or nested triangular frames (not shown); 6) a hexagonal tine and a hexagonal frame, or two concentric or nested hexagonal frames (not shown). This listing does not in any sense exhaust the possible proof mass combinations included within the spirit and scope of the invention.

Figure 7:
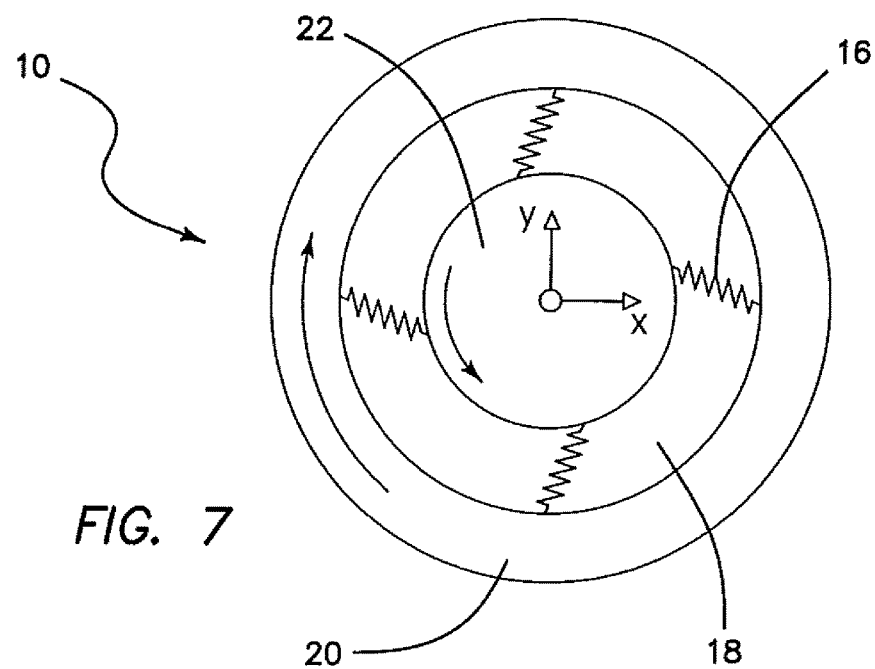
FIG. 7 is a diagram of a balanced torsional mode of the gyroscope architecture of FIG. 6.

It is possible to drive the architecture of the illustrated embodiments into torsional vibratory modes, where the inner proof mass 22 and outer proof mass 20 rotate in anti-phase motion as depicted in FIG. 7. In this configuration torque balance can be obtained by designing the proof masses 20, 22 such that the net angular momentum is approximately zero at all times:

$$J_1 \varepsilon_1 = -J_2 \varepsilon_2 \text{ or } J_1 \varepsilon_1 + J_2 \varepsilon_2 = 0$$

Where J is the moment of rotational inertia and ε the angular velocity.

Figure 8:
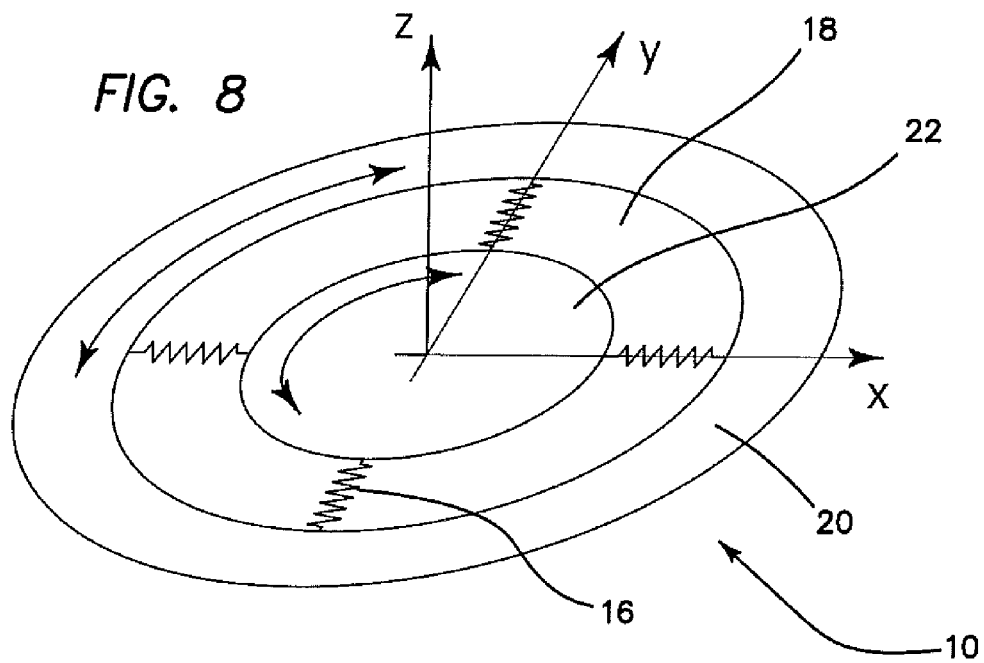
FIG. 8 is a diagram of an in-plane (z axis) torsional mode of the architecture of FIG. 6.
Figure 9A:
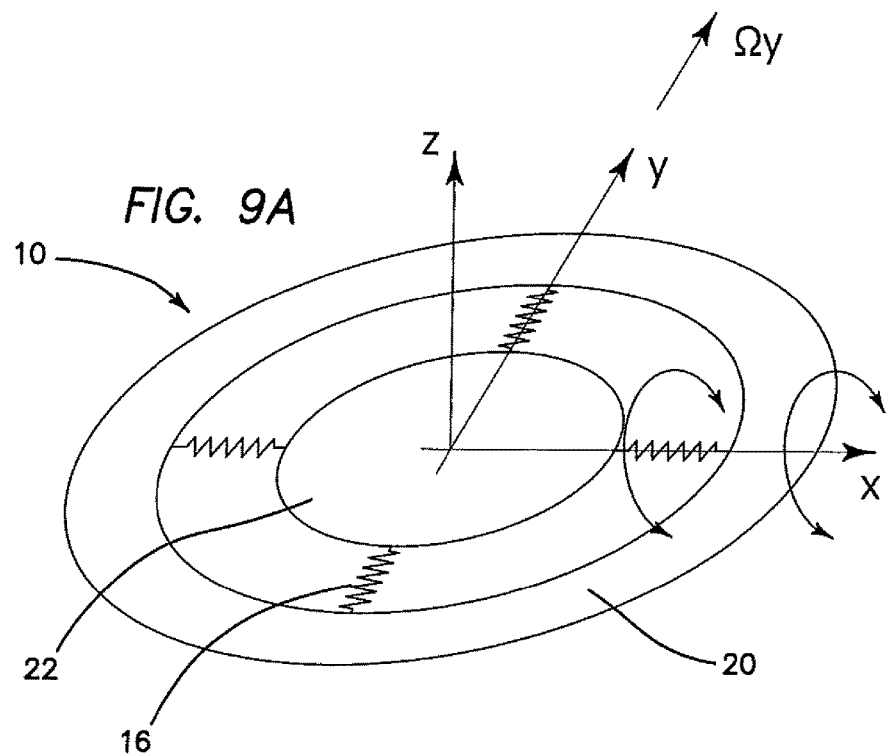
FIG. 9a is a diagram of an out-of-plane x axis torsional mode of the architecture of FIG. 6.
Figure 9B:
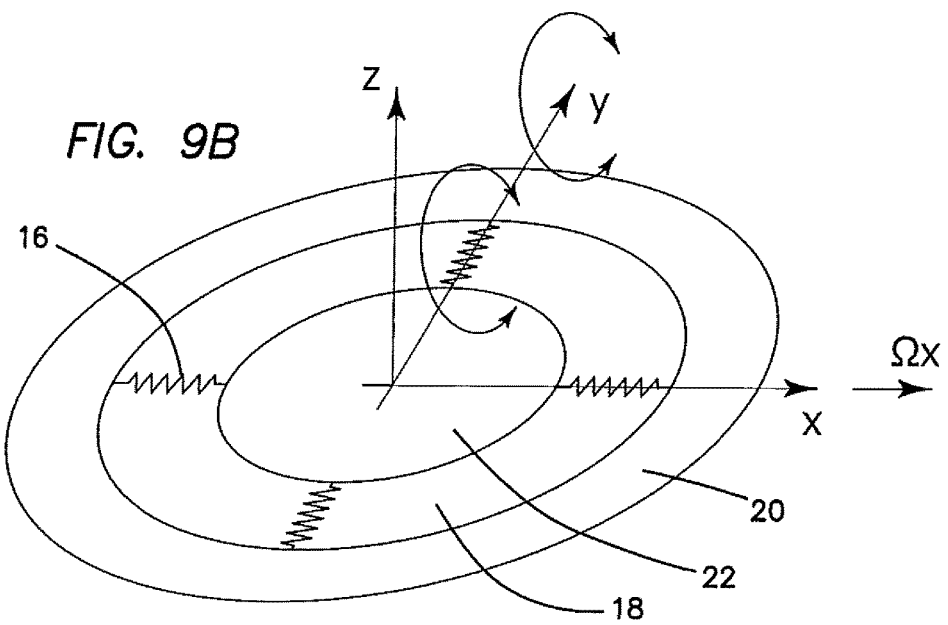
FIG. 9b is a diagram of an out-of-plane y axis torsional mode of the architecture of FIG. 6.
Figure 11A:
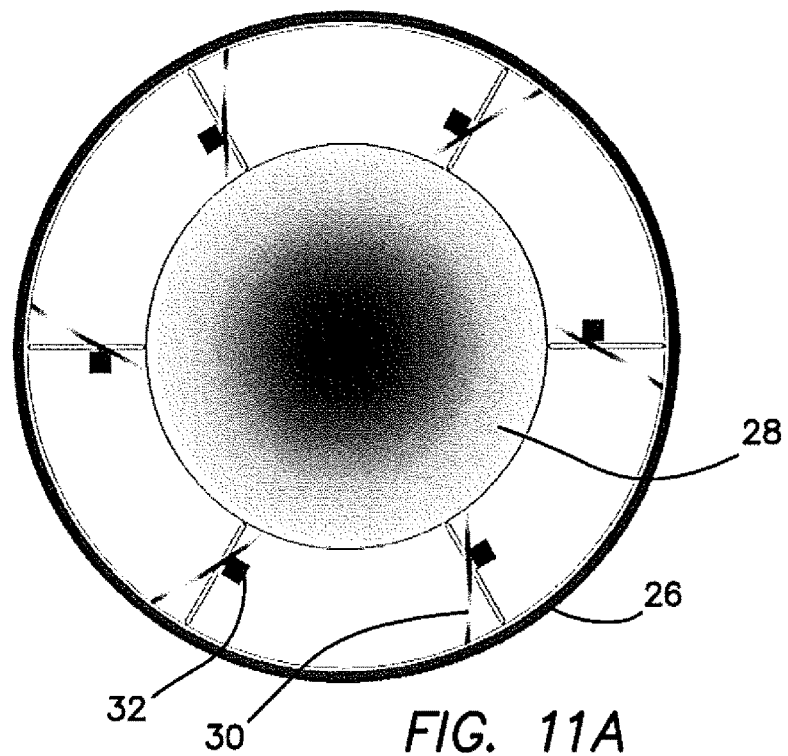
FIG. 11a is a diagram of an in-phase mode torsional mode of the device of FIG. 10. This mode is the unwanted mode to be suppressed.
Figure 11B:
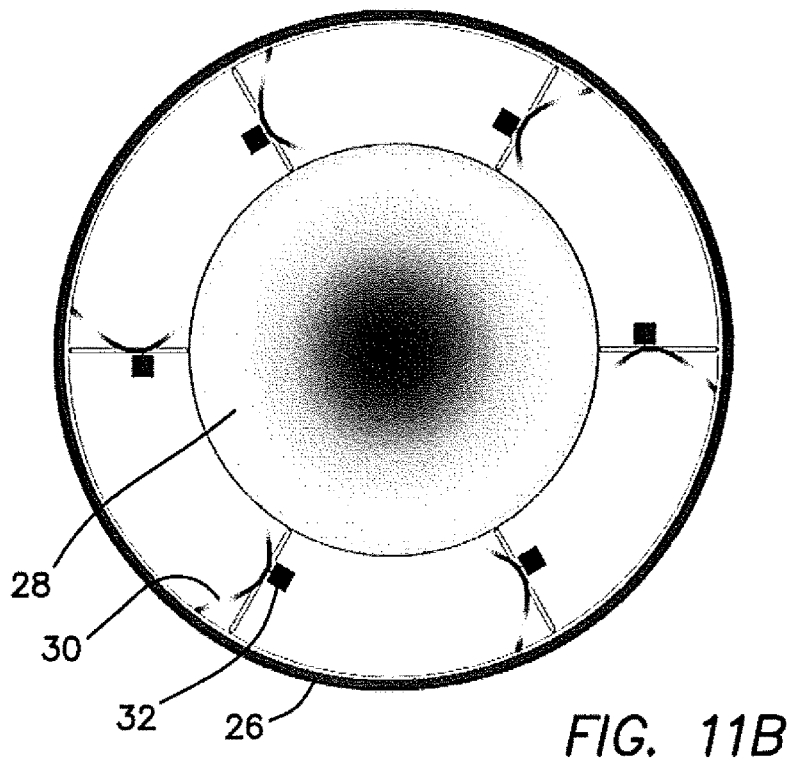
FIG. 11b is a diagram of an anti-phase torsional mode of the device of FIG. 10. This mode vibrates in anti-phase and may provide immunity to external vibrations.

Torsional modes can be used if the device will be instrumented as a timing element (i.e. resonator motion is used as a clock) or as a XY gyroscope 10. For XY gyroscope implementation the gyroscope 10 is driven into resonance along z-axis as depicted in FIG. 8, and when out-of-plane torsional modes are measured, which are sensitive to rotation input along x and y axes as depicted in FIGS. 9a and 9b.

Another implementation of the illustrated architecture is a timing element or clock 24. In this mode operation clock 24 is excited in z-axis torsional mode using a feedback circuit, such that the clock 24 is under self-resonance. The resonance frequency of the primary torsional mode can be used as a timing reference. The effects of external vibrations can be minimized by designing stiffer in-phase modes. This would effectively decrease the amount of displacement that would occur due to external vibrations, minimizing shifts in frequency. The challenge in this approach lies in keeping the anti-phase mode at the desired resonance frequency, while making the in-phase mode frequency higher and further away from the anti-phase frequency. In order to tackle this problem, a lever mechanism provides a convenient means of forcing the in-phase mode to higher frequencies.

Figure 10:
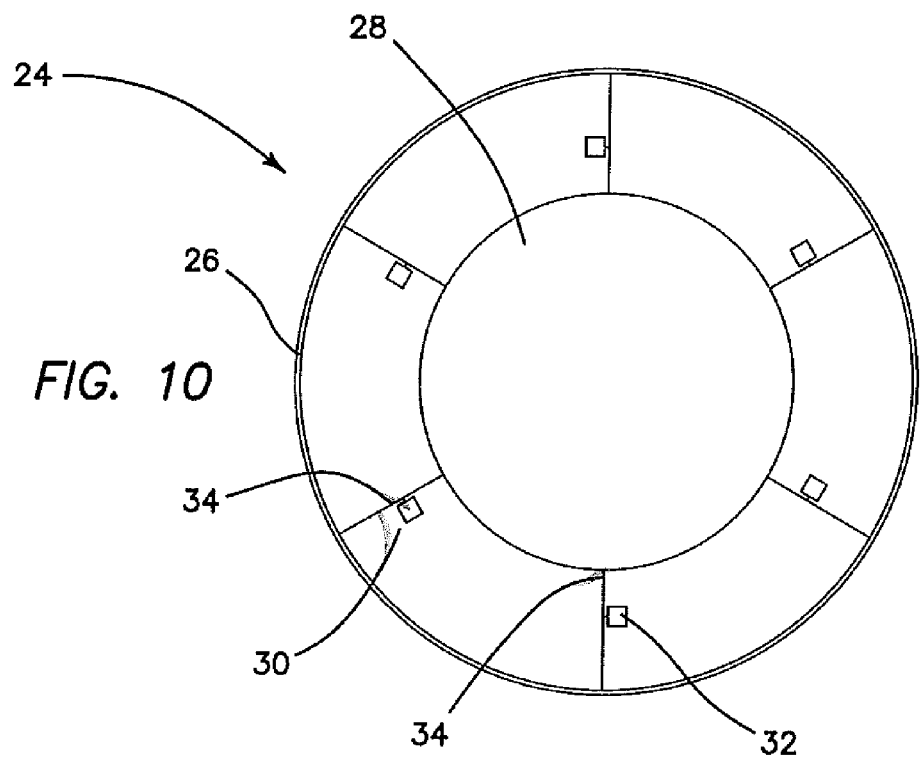
FIG. 10 is a diagram showing an architecture for the vibratory parts of a gyroscope configured as a clock or timing device.

A concentric torsional ring resonator 24 is comprised of two concentric rings 26, 28 that have the same rotational inertia. Inner ring 28 and the outer ring 26 are excited in anti-phase mode with equal rotational velocities. The anti-phase motion is enforced by six anchored lever mechanisms 30 placed between the two rings 26 and 28 as depicted in FIG. 10. The circular nature of the resonator 24 makes it possible to use only lever mechanisms 30 to support the structure, whereas a linear design would have required springs in addition to levers in order to support the proof masses. Since, only levers 30 are used in the torsional ring resonator 24 and their in-phase stiffness is very high, and a higher level of frequency separation can be achieved.

Another advantage of the torsional ring design (although not as significant) is a high-degree of flexibility in configuring drive and sense modes, due to four or more balanced comb drive structures. Each lever mechanism 30 has a pivot point 32 between the two rings 26, 28. These pivot points 32 are connected to anchors, which connect the device layer to the substrate 18. The tips 34, where the levers 30 connect to the rings 26, 28 and the connection at the pivot point 32 have significantly smaller width than the overall width of the lever 30. When the levers 30 are tilted, sections 34 at the end of the levers 30 and the connection 34 at the pivot point deflect, whereas the lever 30 itself stays rigid. This enables the concentric rings 26, 28 to move in opposite directions with respect to the pivot point 32. In order to force the rings 26, 28 to oscillate in equal and opposite velocities, the pivot point 32 is placed at a location that is not at midpoint of the lever 30.

Another important design decision is the location of the comb drives and parallel plates. As will be explained below contribution of individual features to rotational inertia is proportional to 4th power of the distance from the center of rotation ($r^4$). This fact makes it very difficult to balance the inertial contribution of noncircular features from the inner ring 28 and the outer ring 26. Even if identical comb drives and parallel plates are used on both rings 26, 28, if their distance from the center of rotation is different, there will be a very large difference in their inertial contribution.

Figure 12:
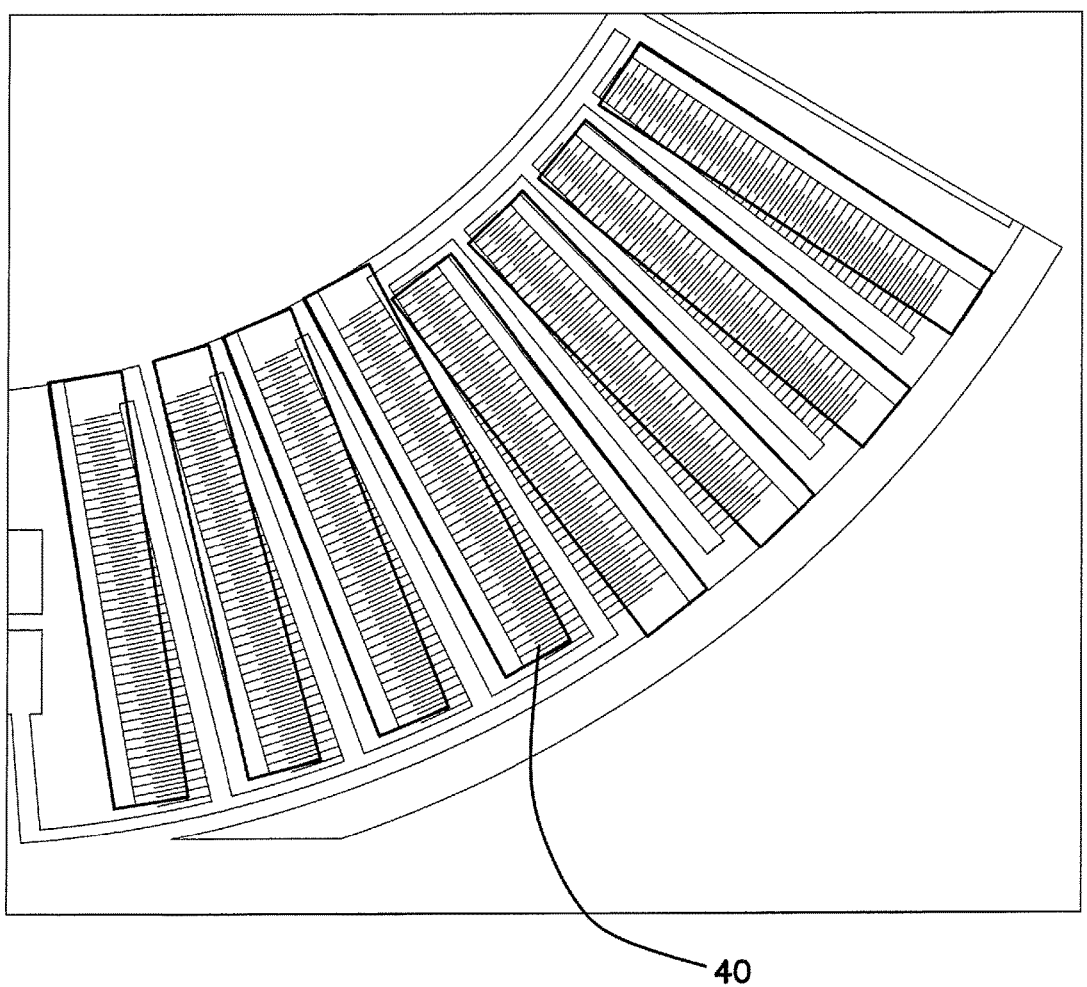
FIG. 12 is a diagram of a portion of a comb drive used in the device of FIG. 10. For the inner and the outer rings identical comb drive and parallel plate structures were used. These structures were placed in between the two rings at exactly the same distance from the center of rotation. By following this approach, it can be made sure that features that are attached to the inner and outer rings have very close moments of inertia.
Figure 13:
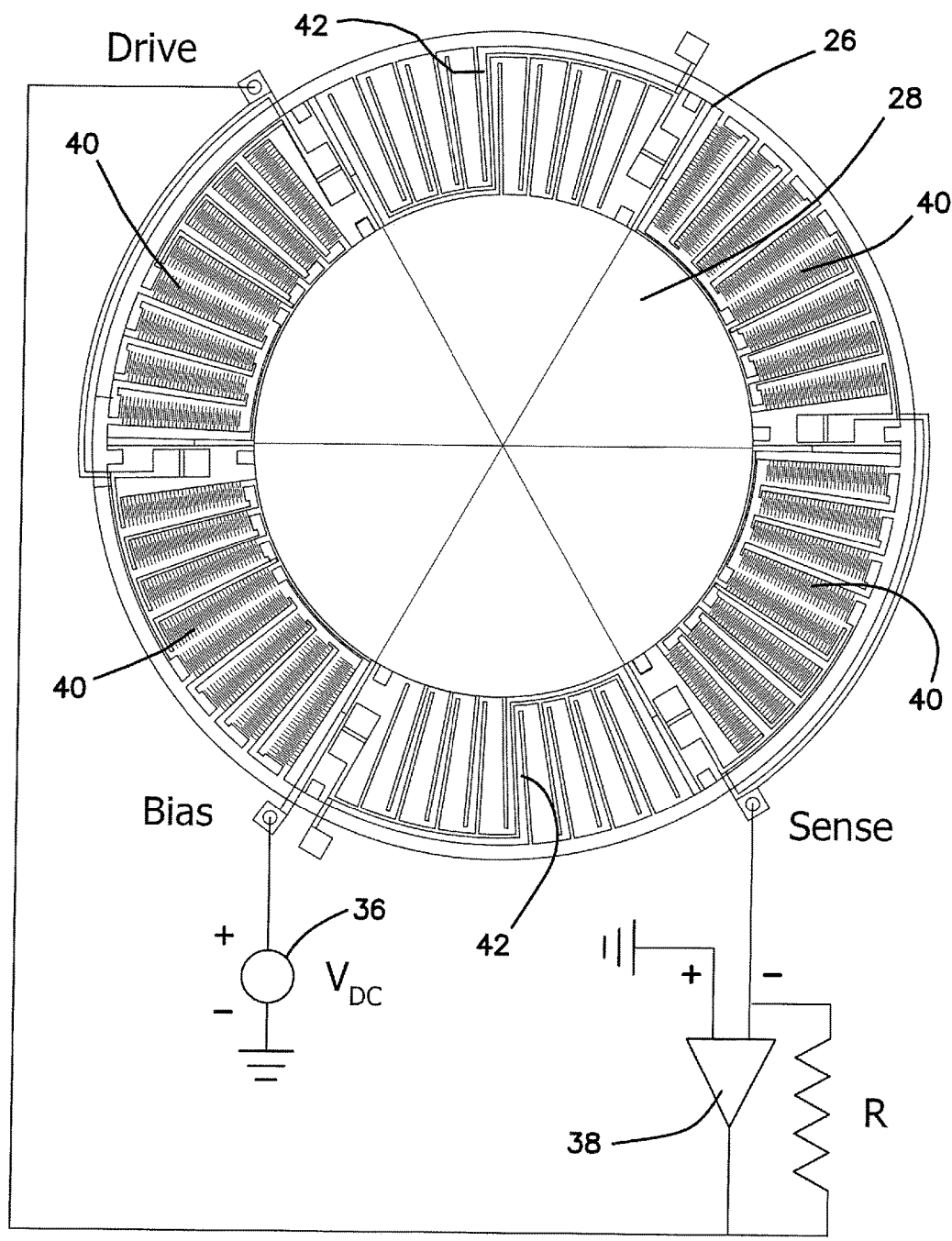
FIG. 13 is a diagram of a self-resonance feedback circuit can be implemented so that the resonator vibrates in its primary resonance frequency.

For this reason an alternative design strategy in used. For the inner and the outer rings 26, 28 identical comb drive 40 and parallel plate structures 42 were used. Comb drives 40 and parallel plate structures 42 can be interchanged with each other with comb drives 40 being used where larger drive amplitudes are required. These structures 40, 42 were placed in between the two rings 26, 28 at exactly the same distance from the center of rotation as seen in FIG. 13. By following this approach, it can be made sure that features that are attached to the inner and outer rings 26, 28 have very close moments of inertia as depicted in FIG. 12. This helps minimize the energy lost to the substrate 18 due to mismatches in rotational inertia. A self-resonance feedback circuit can be provided so that the resonator 24 vibrates in its primary resonance frequency. This can be accomplished by applying a DC bias 36 to the resonator mechanical element 26, 28, connecting the output from the pick-off electrodes to an operational amplifier 38 and using the operational amplifier output to drive the mechanical structure. The resultant output signal can be used as a frequency reference as shown in the schematic of FIG. 13.

Figure 14:
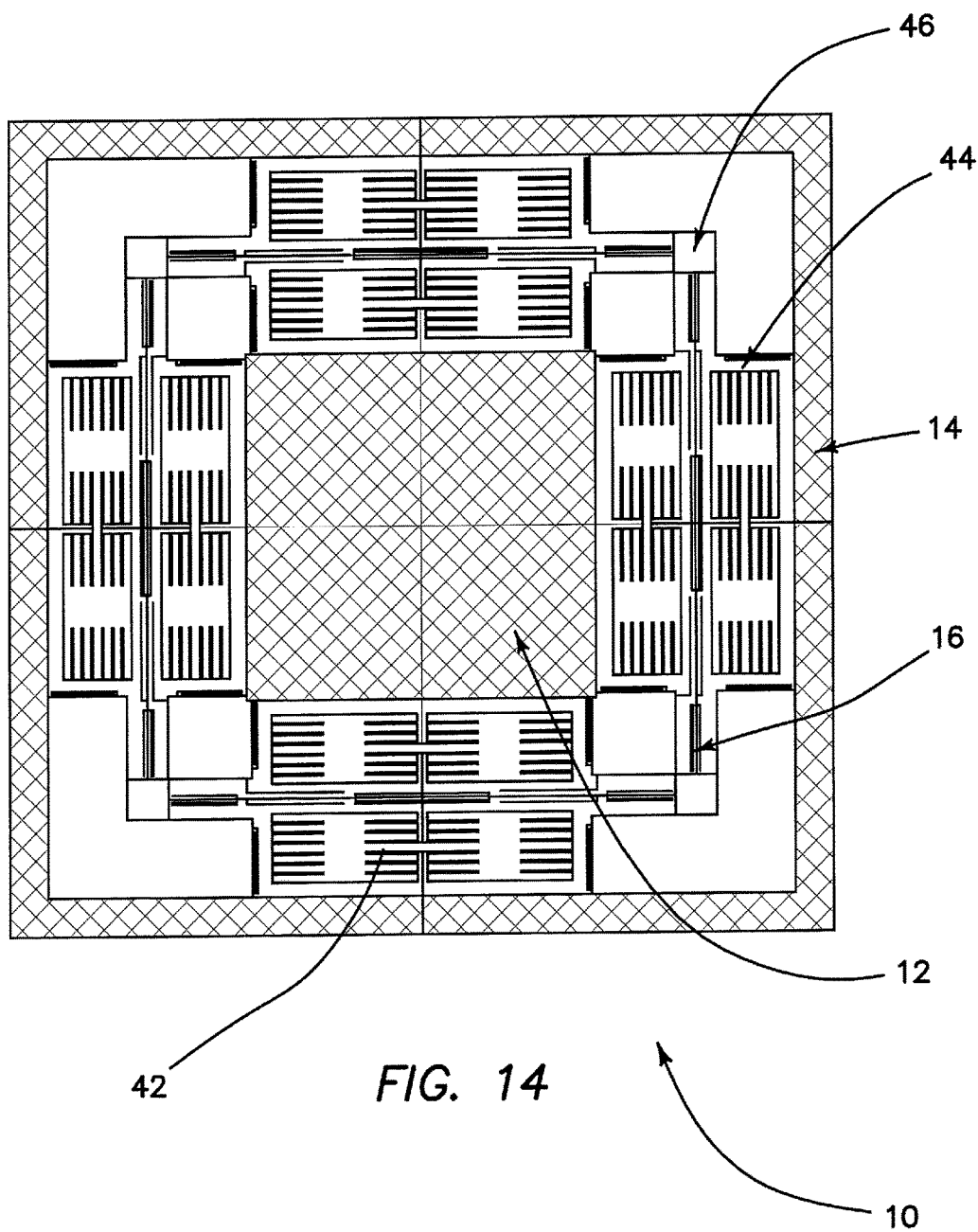
FIG. 14 is top plan view of the z-axis gyroscope. Parallel plates are used for electrostatic drive and pick-off in the illustrated embodiment.

The balanced z-axis gyroscope 10 of the illustrated embodiments has been fabricated using a standard silicon-on-insulator (SOI) process as depicted in FIG. 14. The gyroscope 10 is comprised of a central proof mass 12 and an outer frame 14 in a first embodiment. The frame 14 and the tine 12 were designed to have the same mass so that the gyroscope 10 is dynamically balanced. In addition to the two primary proof-masses 12, 14 there are eight decoupling frames or shuttles 44 within the gyroscope 10. These decoupling frames 44 minimize unwanted lateral motion on the drive and pickoff electrodes. The entire structure is supported by four anchors 46 that connect the proof masses 12, 14 to the substrate 18. Shuttles 44 include a plurality of capacitive plates 42. In FIGS. 14, 15a, 15b and 16 only the movable shuttle 44 and its capacitive plates 42 are shown. It is to be understood that above or below each shuttle 44 is an identical fixed shuttle (not shown) and its plurality of fixed plates (not shown) which are interleaved with the plates 42 in the moving shuttle 44 which lies above or below the fixed shuttle. The fixed shuttle and its plates have been omitted from the drawings of FIGS. 14, 15a, 15b and 16, since including their depiction would render the drawing difficult to understand and clearly visualize.

Figure 15A:
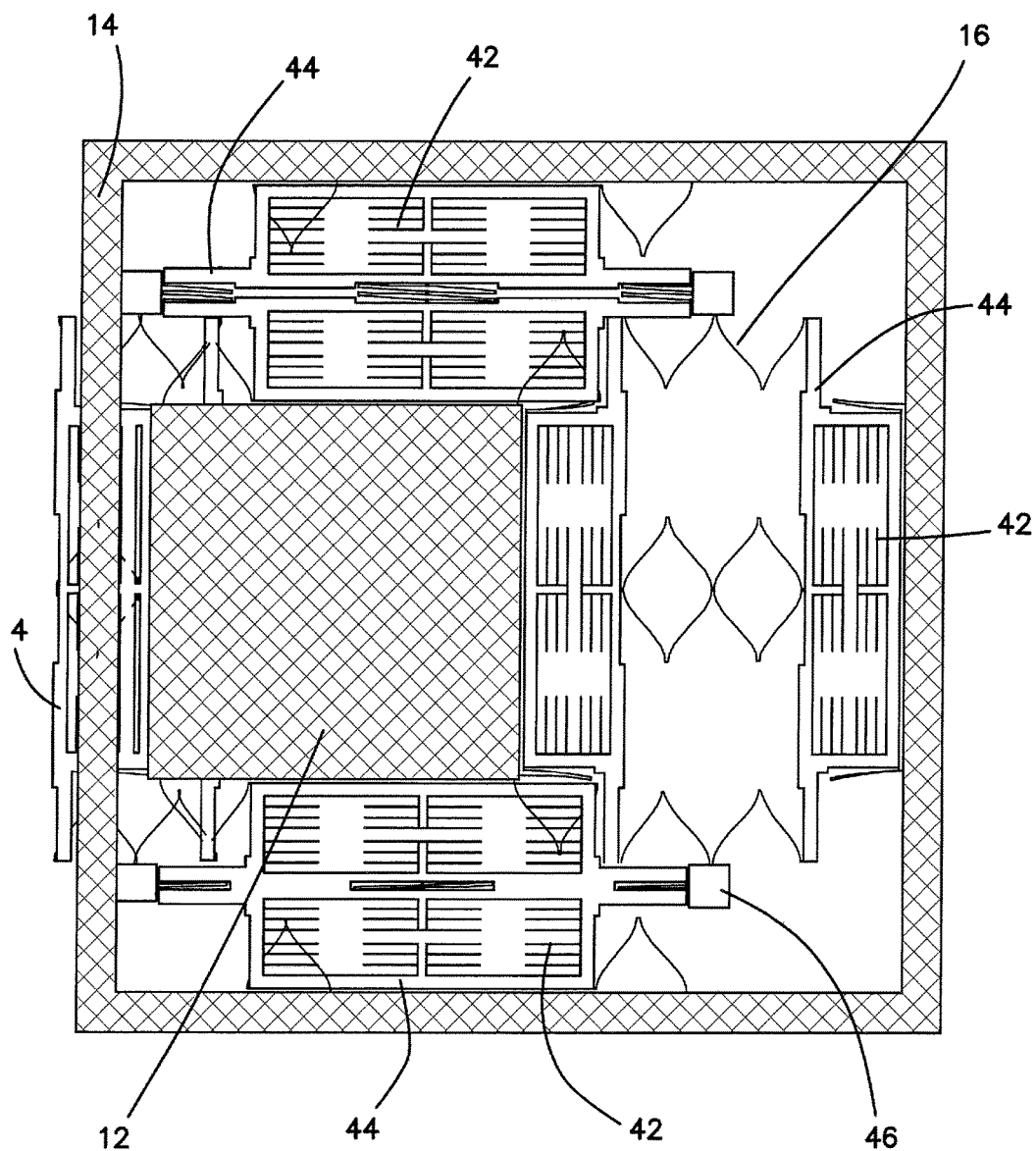
FIG. 15a is a two dimensional finite element analysis showing the primary vibration mode along x axis of the device of FIG. 14.
Figure 15B:
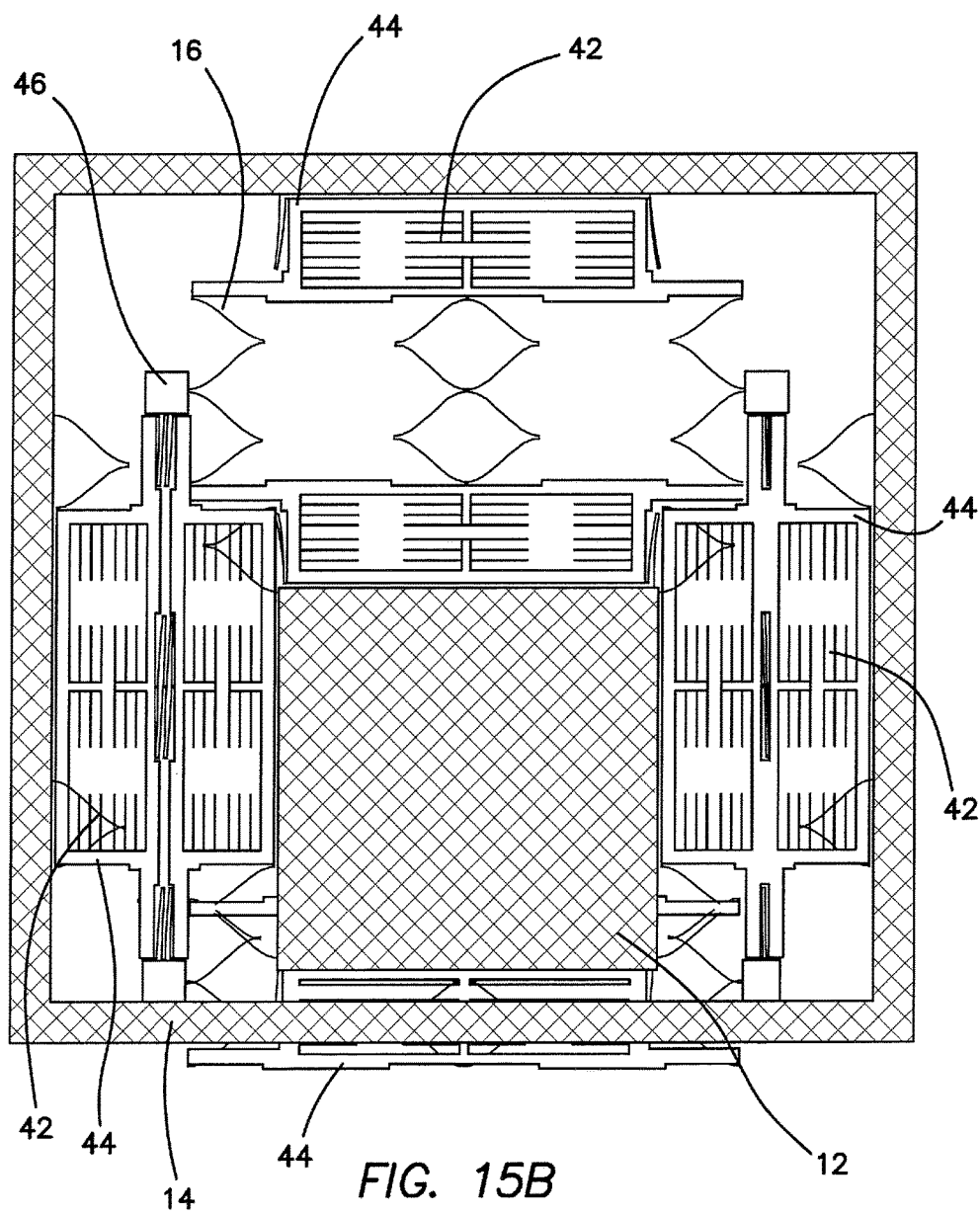
FIG. 15b is a two dimensional finite element analysis showing the primary vibration mode along y axis of the device of FIG. 14.
Figure 16:
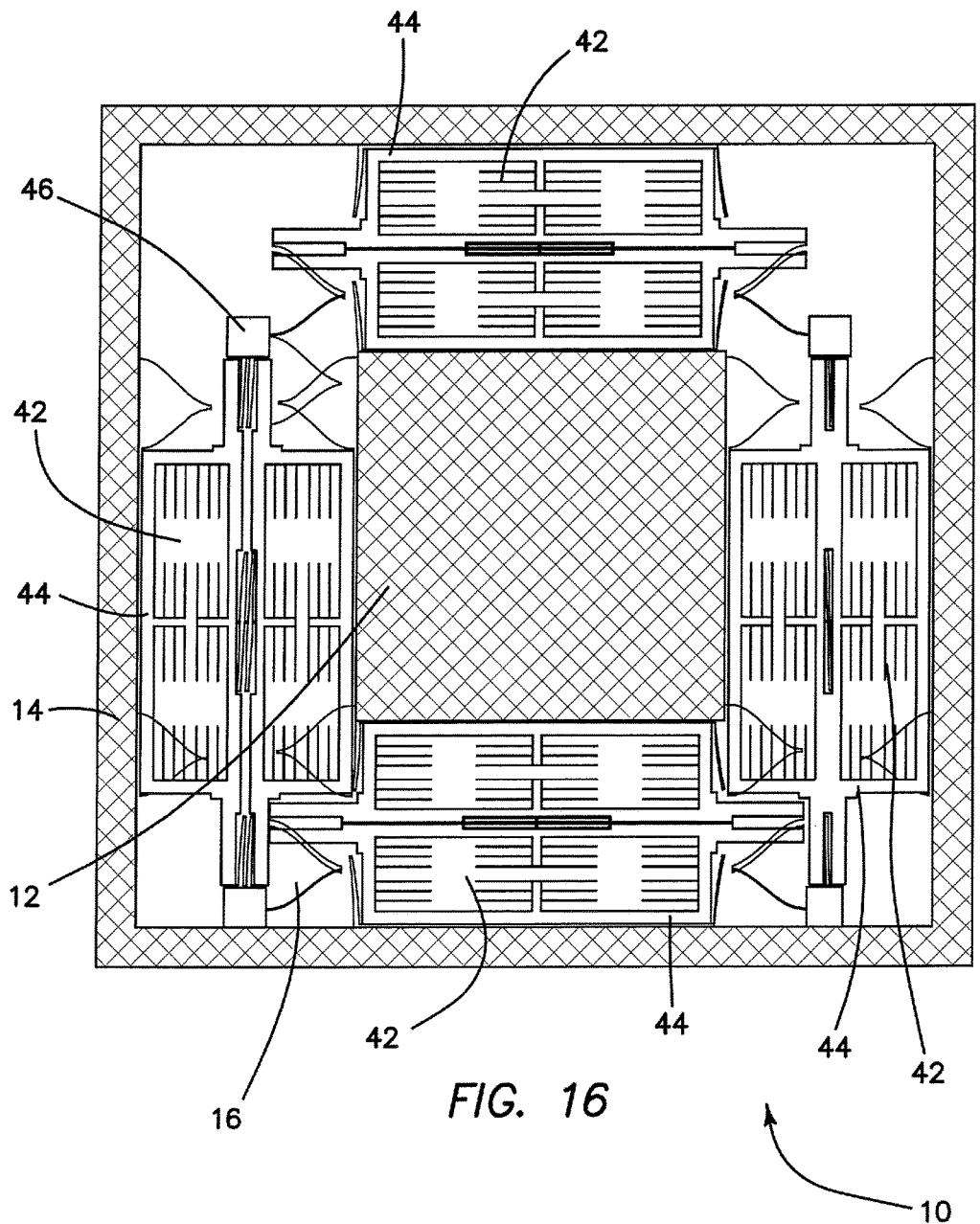
FIG. 16 is a two dimensional finite element analysis showing the in-phase mode along y axis of the device of FIG. 14.

Finite element analysis results show primary resonance modes of the vibratory structure in a highly exaggerated configuration in FIGS. 15a, 15b and 16. Again it must be kept in mind that only the moving shuttles 44 and plates 42 are depicted and that the extent of movement has been grossly exaggerated to make visualization easier. Thus, the plan view of shuttles 44 and plates 42 have been distorted so that portions are unseen in the drawings or in relative positions never actually assumed. The movement of shuttles 44 are of the order of a micron and would be virtually undetectable in the drawings were the movements of the various elements drawn to an accurate scale. Anti-phase motion pushes the frame 14 and tine 12 away from each other. FIG. 15a illustrates antiphase motion along the x axis and FIG. 15b illustrates antiphase motion along the y axis. In-phase motion (both proof masses 12, 14 moving in the same direction) are shown in FIG. 16. These modes are unwanted modes for gyro operation but can be used for sensing of acceleration.

Figure 17A:
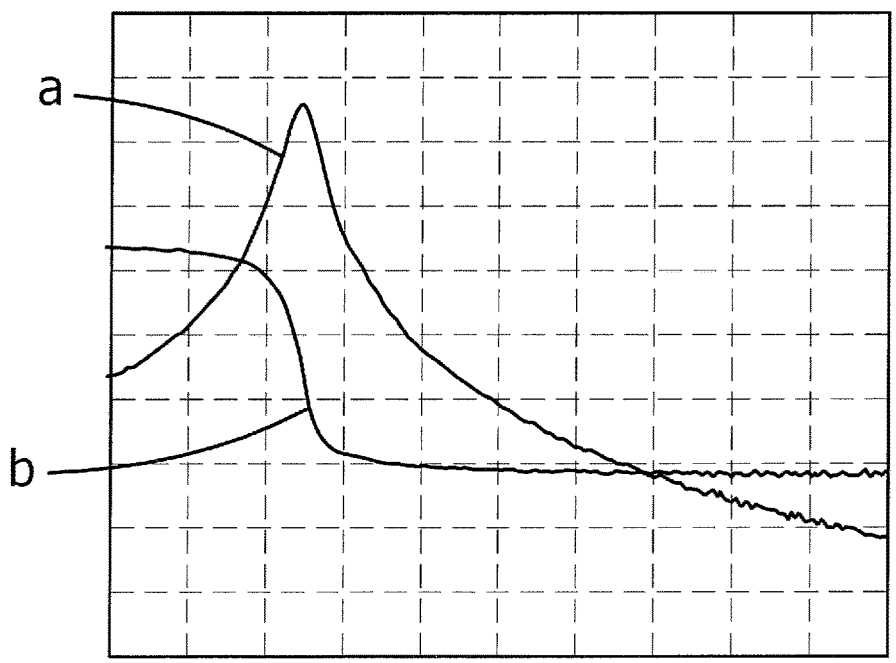
FIG. 17a is a graph of amplitude of vibration verses frequency in a frequency sweep showing one of the primary resonance modes showing amplitude in graph line a and phase in graph line b of the device of FIG. 14.
Figure 17B:
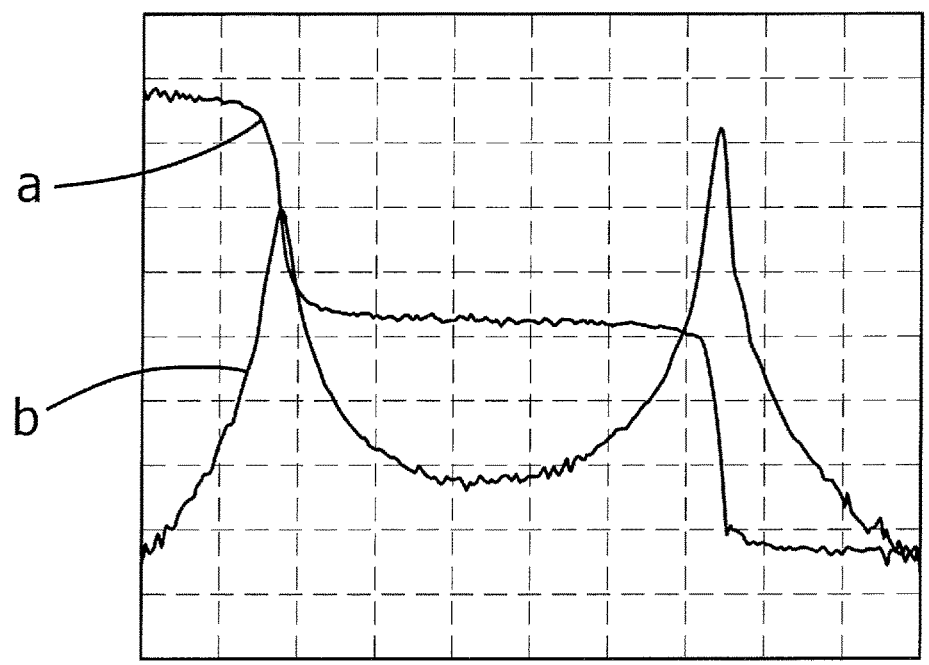
FIG. 17b is a graph of amplitude of vibration verses frequency in a frequency sweep showing both of the primary resonance modes showing amplitude in graph line a and phase in graph line b of the device of FIG. 14.

Gyroscope 10 was connected to a printed circuit board based front-end electronics for testing. The fabricated gyro 10 is extremely small, with a foot-print of 2 mm×2 mm. Characterization of the gyros 10 revealed quality factors above 150,000 on both primary resonance modes as depicted in the graphs of FIGS. 17a and 17b, demonstrating the feasibility of the anti-phase architecture. The illustrated embodiment is the highest Q-factor degenerate mode gyroscope thus far built at 2 mm×2 mm size or smaller.

Figure 18:
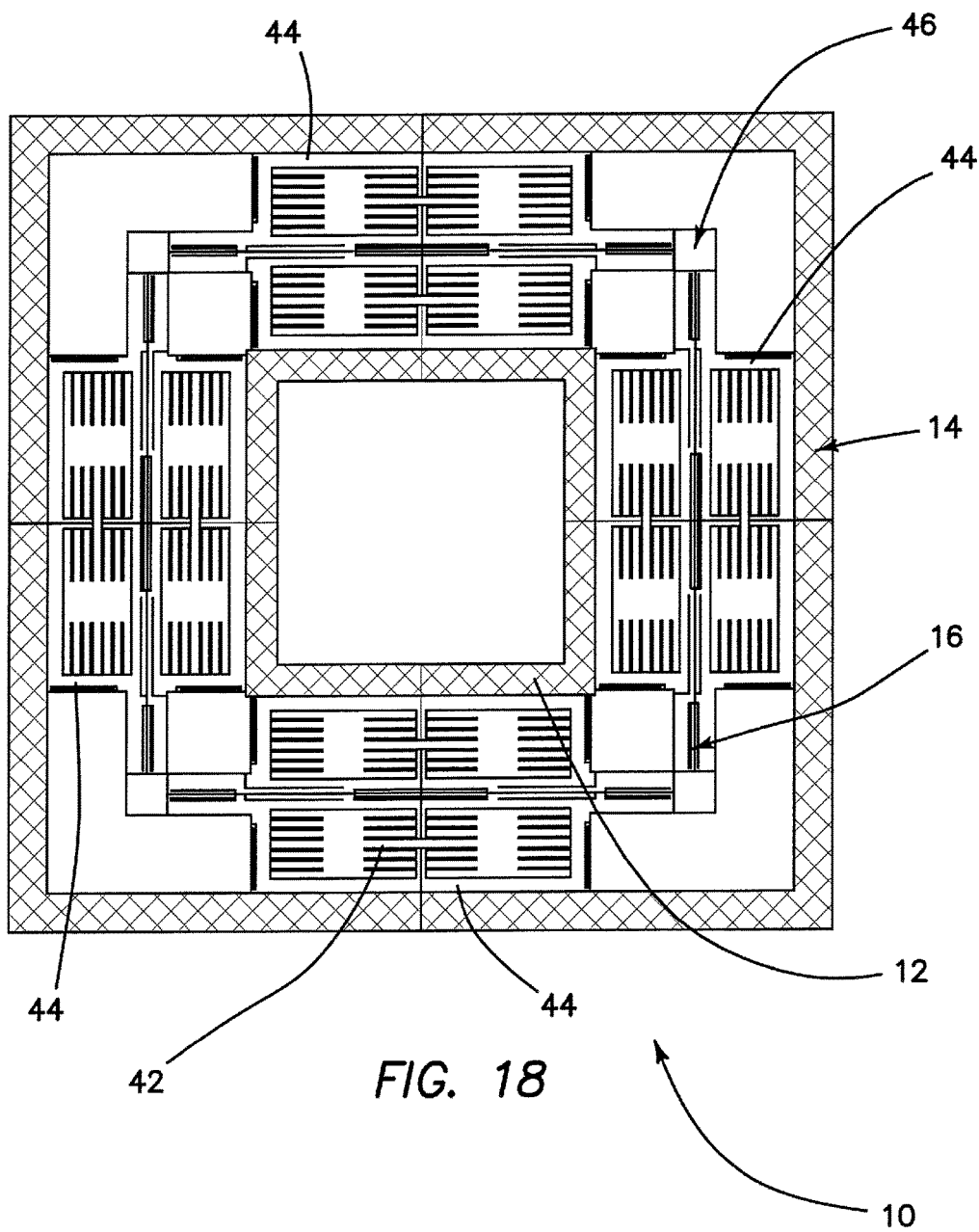
FIG. 18 is a diagram of a gyroscope having two nested square frames as the mechanical vibratory elements.

FIG. 18 is a top plan view diagram of an embodiment where inner proof mass 12 and outer proof mass 14 assume the form of open rectangles or squares in place of the square inner proof mass 12 and outer proof mass 14 of the embodiments of FIGS. 14, 15a, 15b and 16.

Figure 19:
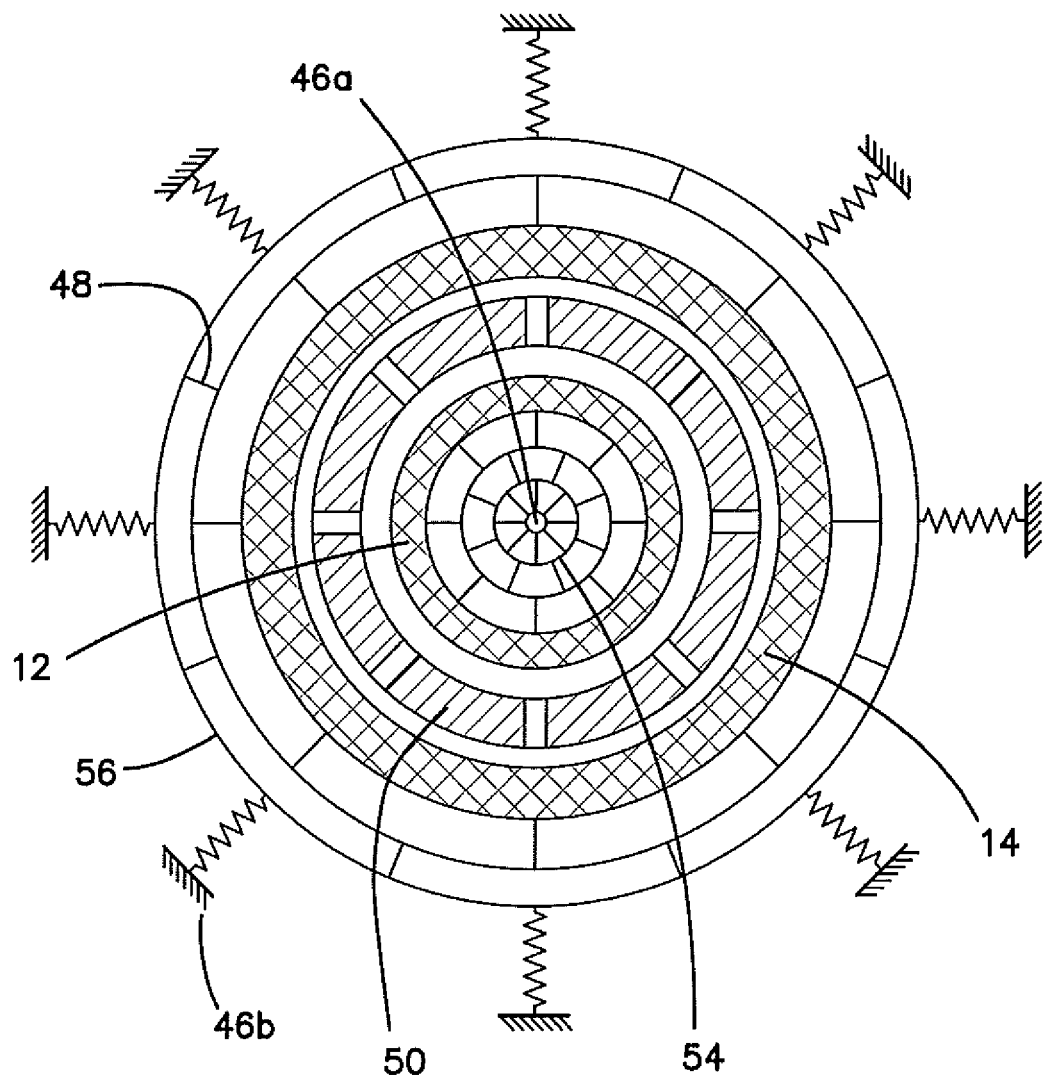
FIG. 19 is a top plan diagram of a gyroscope having multiple nested rings as the mechanical vibratory elements.
Figure 20:
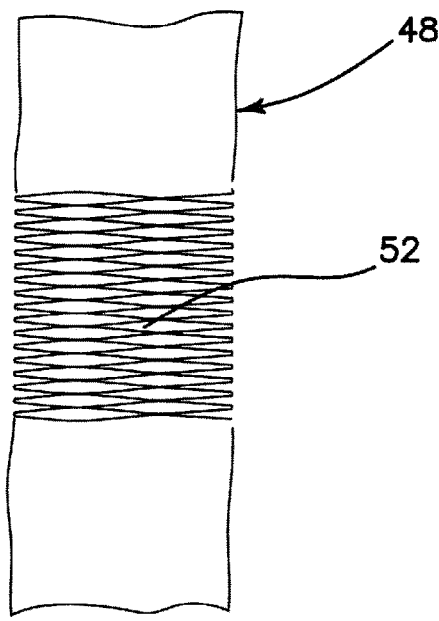
FIG. 20 is an enlarge scale to plan view of the structure of a spoke used to connect the nested rings of the embodiment of FIG. 19.

FIG. 19 is a top plan view diagram of another embodiment of gyroscope 10 wherein the inner proof mass 12 and outer proof mass 14 are in the shape of multiple concentric rings coupled to each other through spokes 48. Spokes 48 are filamentary connectors comprises of a plurality of rows of stacked leaf springs 52 connected at their ends and midpoints to leaf springs 52 in the two adjacent rows of leaf springs 52 such as shown in FIG. 20 in enlarged scale. Spoke 48 thus comprises a structure which is capable of being longitudinally stretched and compressed in variable amounts so that the spoke 48 can bend or twist to the sides as well.

FIG. 19 illustrates an embodiment where a central anchor 46a to the substrate 18 is coupled through two series of a plurality of spokes 48 to two thin concentric rings 54 serving as a suspension system. The outer one of the two rings 54 is then coupled through a plurality of spokes 48 to an inner ring proof mass 12. A plurality of azimuthal segments of ring electrodes 50 are circumferentially disposed around inner ring proof mass 12. Adjacent to electrodes 50 is an outer ring proof mass 14, which is supported by a plurality of spokes 48 to two thin concentric rings 56, serving as a suspension system and interconnected to each other and to a plurality of anchors 46b to substrate 18 by a plurality of spokes 48. By means of this configuration a torsional or vibratory ring gyroscope 10 is achieved.

Figure 22A:
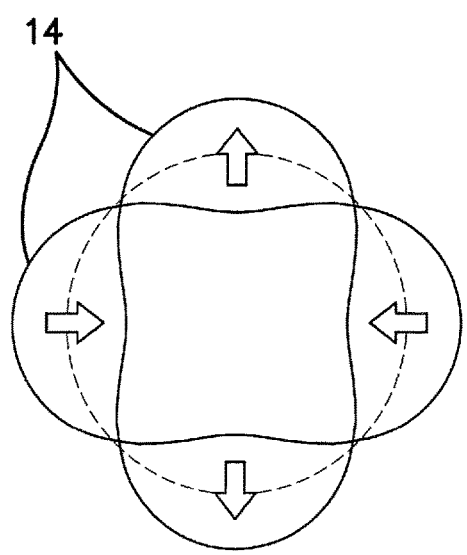
FIGS. 22a and 22b are simplified diagrams of a circular ring proof mass illustrating two possible wineglass modes where a n=2 and n=3 wineglass mode is shown respectively.
Figure 22B:
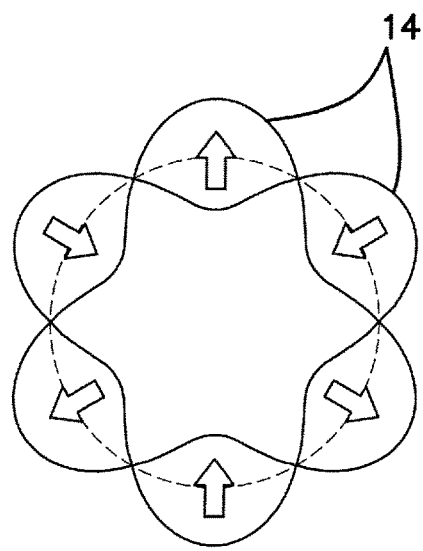
Figure 21A:
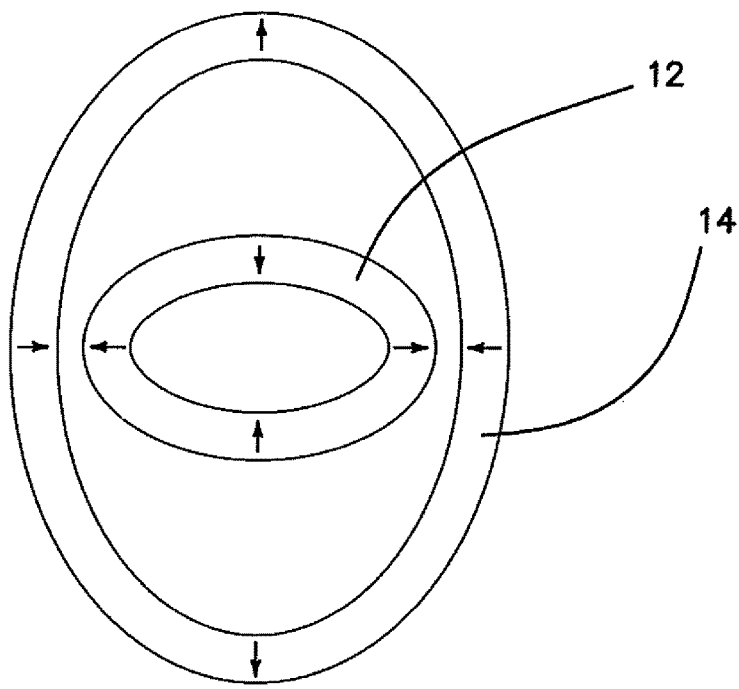
FIGS. 21a and 21b is a simplified diagram of the vibrational modes of the gyroscope of FIG. 19 with the arrows indicating the direction of motion.
Figure 21B:
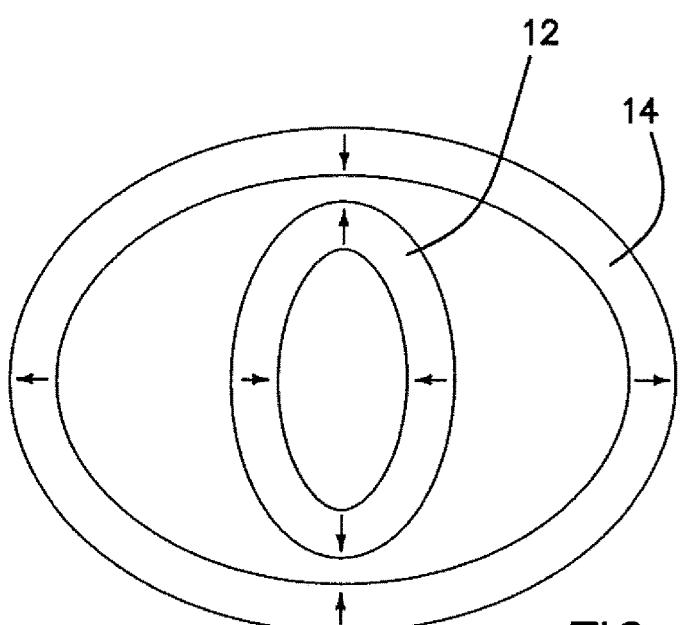

FIGS. 21a and 21b are simplified top plan view diagrams of the vibrational modes of the gyroscope 10 of FIG. 19 showing in a highly exaggerated scale the movement of only the proof masses 12 and 14 with all other elements removed for the same of clarity. The modes in FIGS. 21a and 21b are the so-called Wineglass modes of vibration in anti-phase motion. The ring proof masses 12 and 13 vibrate in opposition to each other so that the rings 12 and 14 synchronistically oscillate toward and away from each other along orthogonal diameters. In the translational modes the proof masses 12, 14 move opposite to each other, while retaining their form moving in rigid body motion. In the case of Wineglass or Lame modes of vibration, the proof masses 20, 22 or 12, 14, themselves, can deform in addition to or instead of any translational motion. In this case, the inner and outer masses 20, 22 or 12, 14, are no longer assumed to be rigid bodies. For example, in the case of a circular ring proof mass, two possible wineglass modes are diagrammatically illustrated in FIGS. 22a and 22b, where a n=2 and n=3 wineglass mode is shown respectively.

Figure 23:
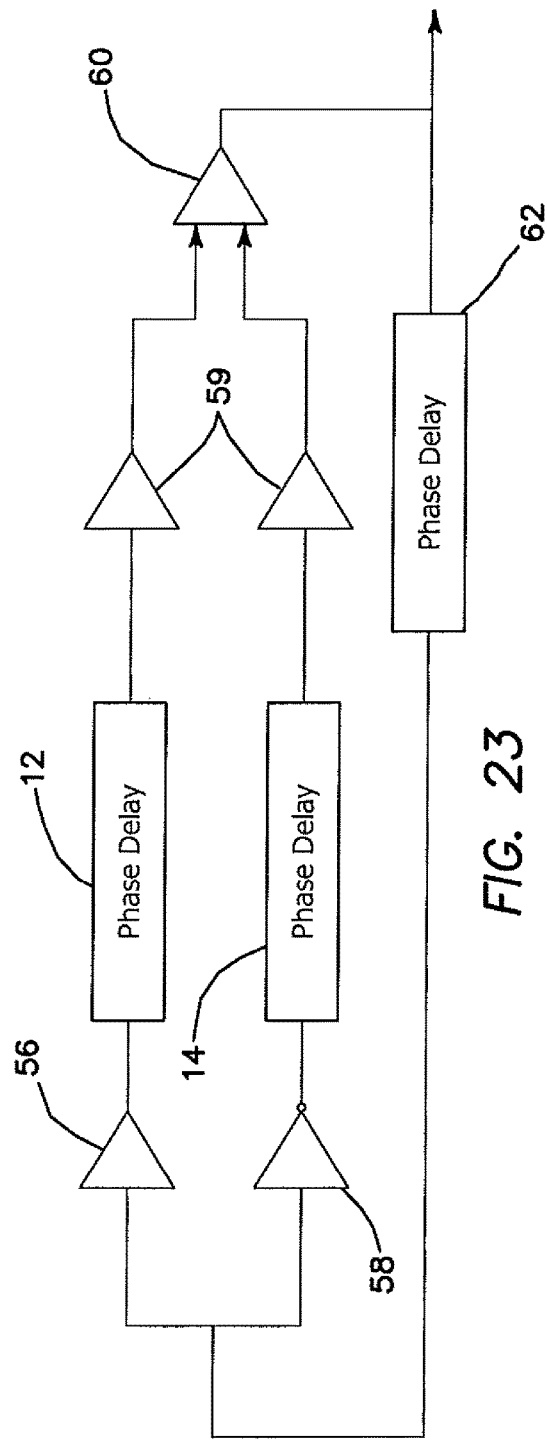
FIG. 23 is a simplified circuit diagram illustrating the basic principles used for controlling the operation of gyroscope.

FIG. 23 is an idealized schematic of the control principles used to drive the gyroscope 10. Proof masses 12 and 14 are mechanically coupled to sense electrodes and are interchangeably represented in the diagram of FIG. 23 as the proof masses or proof mass sensors 12, 14. The sensed signal is a current which is converted to voltages by corresponding amplifiers 59. In the most basic implementation, a summing amplifier 60 is connected to the sensor outputs of the inner and outer proof masses 12, 14, through amplifiers 59, where the output related to inner proof mass 12 is communicated to the positive terminal (+) and the output related to outer proof mass 14 is communicated to the negative (−) terminal of amplifier 60. The output of the summing amplifier 60 is fed to an inverting amplifier 56 and a non-inverting amplifier 58 through a phase delay circuit 62 so that the drive signal applied to the inner proof mass 12 through actuators 42 is +/−180° out of phase to the drive signal applied through actuators 42 to the of the outer proof mass 14. To achieve self-oscillation, in-phase and anti-phase drive signals are fed back to the respective actuators 42 coupled to proof masses 12, 14 after applying a fixed delay set into phase delay circuit 62. By manipulating the gains of the amplifiers 56, 58 and 59 antiphase, or in-phase operation of gyroscope 10 is achieved.

Figure 24:
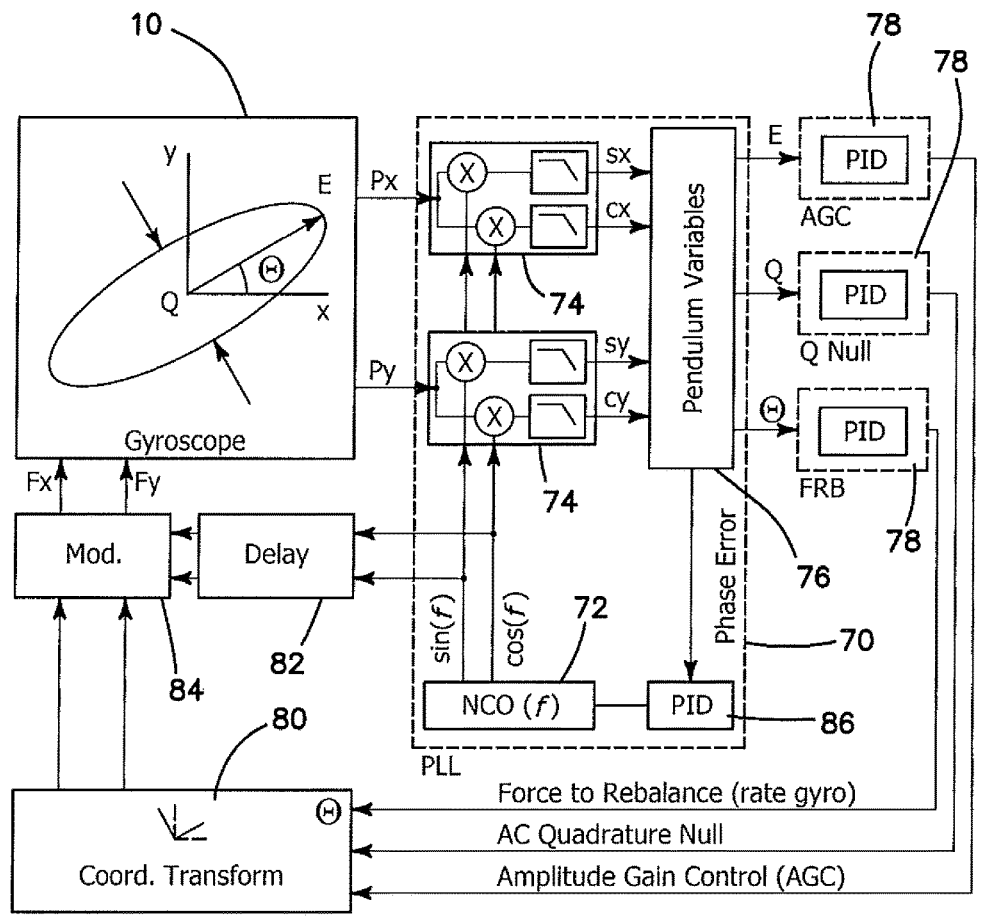
FIG. 24 is a block diagram of a circuit for controlling the gyroscope of the illustrated embodiments.

Alternatively the output of the summing amplifier 60 can be connected to a control system shown in FIG. 24 and fed into a phase locked loop circuit (PLL). The output of the phase locked loop circuit would then be fed into the inverting and non-inverting amplifiers 56, 58 to be fed back into the gyroscope.

FIG. 24 is a simplified block diagram of a control circuit for gyroscope 10. The x, y pickoff electrode signals, Px, Py, are provided as inputs to PLL amplifier 70. Pickoff electrode signals, Px, Py, are mixed and low pass filtered with orthogonal phase shifted sinusoidal signals from numerically controlled oscillator (NCO) 72 in mixers 72. The double Foucault pendulum variables, E, Q and θ, that characterize the oscillation of the gyroscope 10 are derived in programmable array 76 from the filtered and mixed pickoff electrode signals, Px, Py. A phase error is generated by array 76 which is fed back through PID controller 86 to NCO 72. From the double Foucault pendulum variables, E, Q and θ, the automatic gain control, AGC. Quadrature null, Qnull, and force-to-rebalance, FRB, signals are derived by means of proportional-integrative-derivative controllers 78. FRB, Qnull and AGC are fed back into a coordinate transformer 80 based on the θ angle of inclination off the coordinate axis of the elliptical double Foucault pendulum characterization. The coordinate transformation together with a fixed delay from delay circuit 82 is fed into modulator 84, which provides the phase lock loop forcing signals, Fx, Fy, to the actuators of gyroscope 10.

Figure 25A:
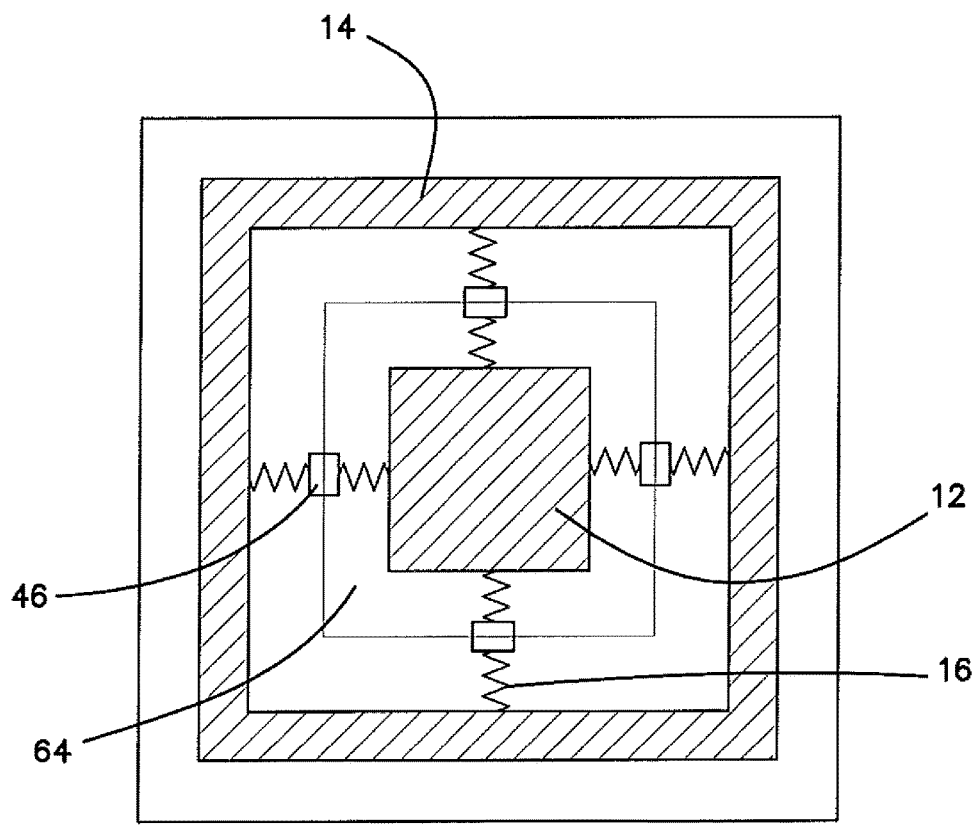
FIG. 25a is a top plan view diagram of a gyroscope combined with a pressure membrane to measure pressure changes.
Figure 25B:
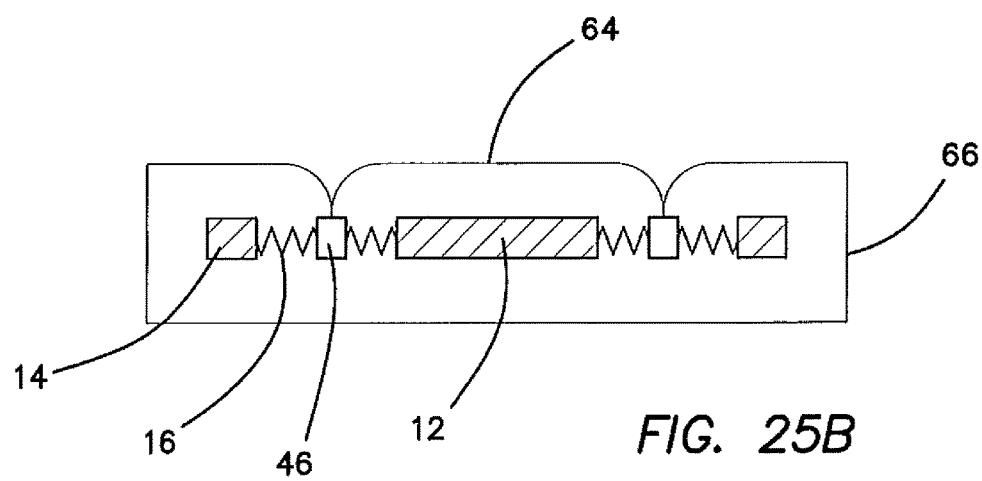
FIG. 25b is a side cross-sectional view of a gyroscope combined with a pressure membrane to measure pressure changes.

FIGS. 25a and 25b illustrate an embodiment wherein a pressure membrane 64 is disposed on anchors 46 and extends as a covering or dome over inner proof mass 12. Gyroscope 10 is disposed in a hermetically sealed container 66 of which membrane 64 forms part. As the environmental pressure in which gyroscope 10 is situated changes, the pressure change is transmitted through membrane 64 to the interior of hermetically sealed container 66 and gyroscope 10 contained therein. The change of pressure in which gyroscope 10 operates shifts the oscillation or resonant frequency at which gyroscope 10 operates in a manner which can be functionally translated into a pressure measurement.

Figure 26:
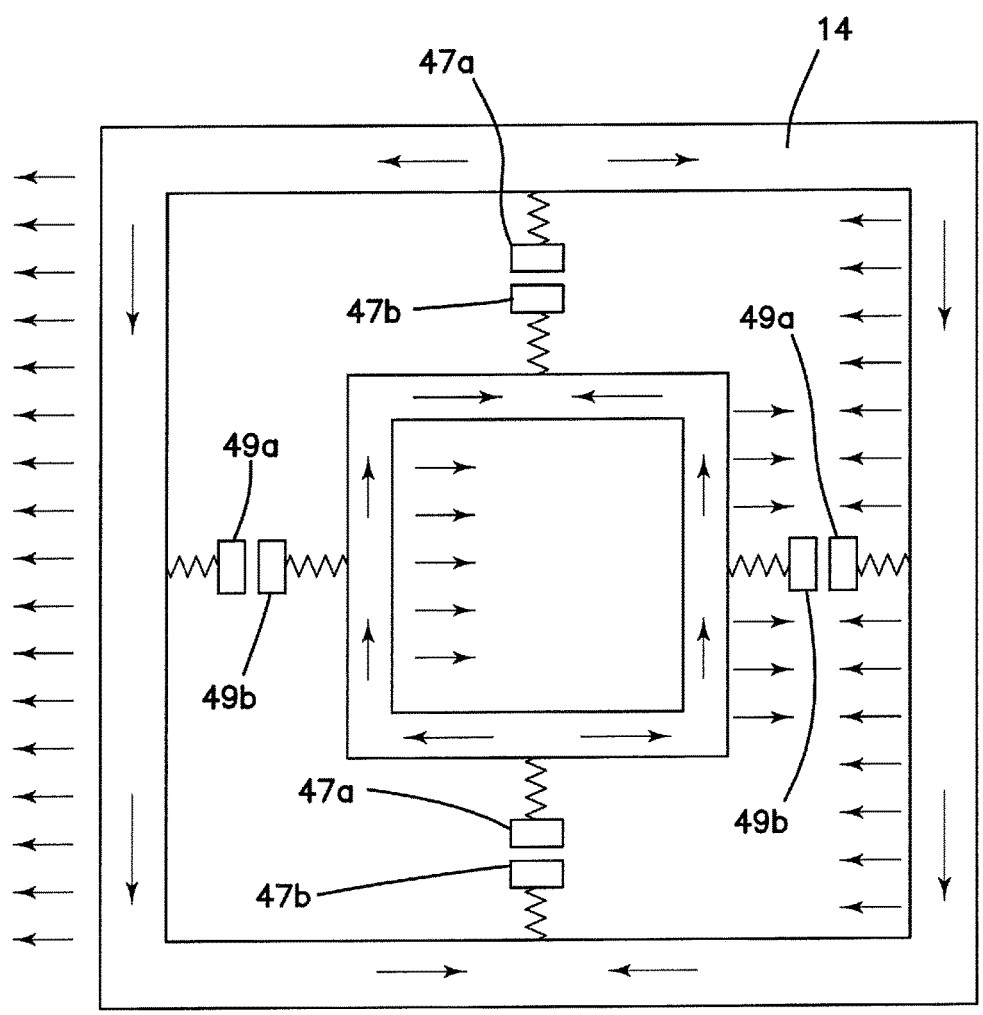
FIG. 26 is a top plan simplified diagrammatic view of a gyroscope in which a current path is established to allow for the measurement of a magnetic field in which the gyroscope is disposed.

FIG. 26 is a top plan view simplified diagram of a gyroscope 10 using nested square proof masses 12, 14. Only selected elements of the gyroscope 10 have been shown for the purposes of clarity of illustration of the principle. The anchors 47a, 47b shown in the top and bottom of the depiction are electrically split so that anchor 47a is coupled to a positive voltage source and anchor 47b is coupled to a negative voltage source. The sense of polarity is an arbitrary choice. Springs 16 and proof masses 12 and 14 are conductive so that current flows from upper anchor 47a through spring 16 to outer proof mass 14 to the lower spring 16 and lower negative anchor 47b. Similarly, current flows from lower anchor 47a through spring 16 to inner proof mass 14 to the upper spring 16 and upper negative anchor 47b. The anchors 49a and 49b coupled through springs 16 to inner and outer proof masses 12, 14 are neutral and electrically isolated from each other so that no current flows through them or their corresponding springs 16. The vibration of proof masses 12, 14 will be subject to a Lorentz force when the current is applied and when the gyroscope 10 is in the presence of a magnetic field. The effect of the Lorentz force will be such that a frequency change in the resonance frequency will result, which can then be functionally interpreted as a measurement of the magnetic field to which gyroscope 10 is subjected.

Figure 27A:
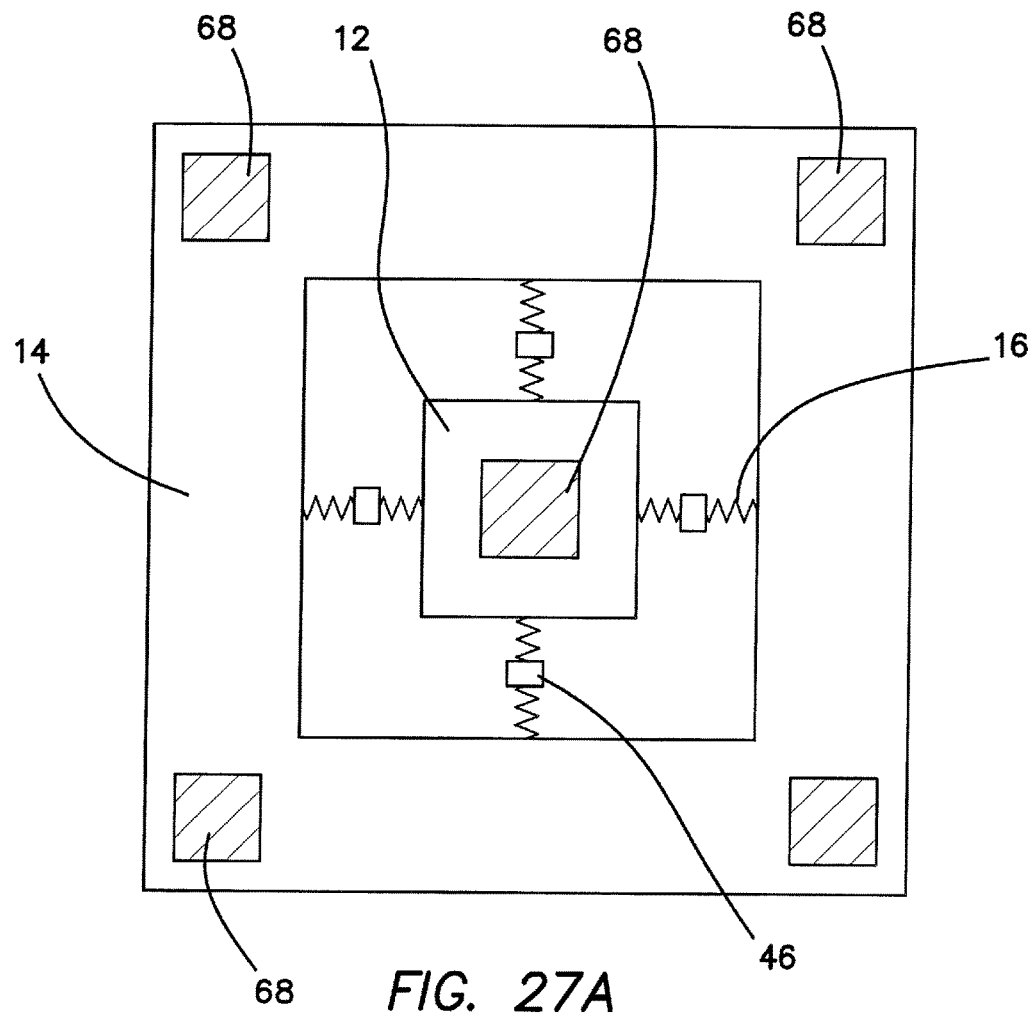
FIG. 27a is a top plan view diagram of a gyroscope combined with a absorption/desorption element to detect presence of a specific chemical/biological substance to measure concentration of a specific chemical/biological substance in the environment.
Figure 27B:
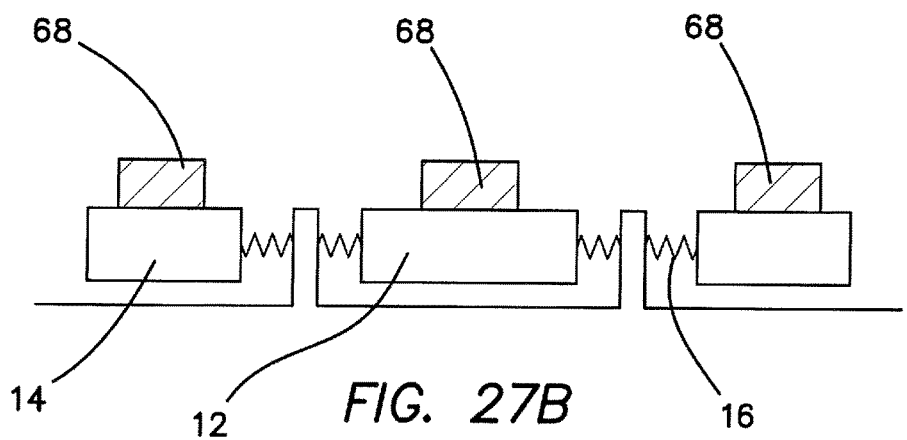
FIG. 27b is a side cross-sectional view of a gyroscope combined with a absorption/desorption element to detect presence of a specific chemical/biological substance to measure concentration of a specific chemical/biological substance in the environment.

FIG. 27a is a top plan view of a simplified diagram of a gyroscope to which an absorption, adsorption, and/or desorption or other detection patch or element 68 has been added. Element 68 may be any kind of detector capable or gaining or losing mass in the presence or absence of a target, which coacts, reacts, attaches or interacts with something included on or in element 68. Element 68 is shown in the embodiment as attached to inner mass 12 and on the corners of outer mass 14, where these masses 12, 14 take the form of a square and a square frame respectively. The addition or loss of mass from element 68 as a result with a change in mass related to the presence or absence of the target will result in a change in the resonant frequency of gyroscope 10, which can then be functionally mapped into a measurement of the target's presence or the fact of its absence. For example, element 68 may be provided with a selective antibody which preferentially attaches to a pathogen. Sufficient concentrations of pathogen will increase the weight of element 68 and be detectable.

Figure 28:
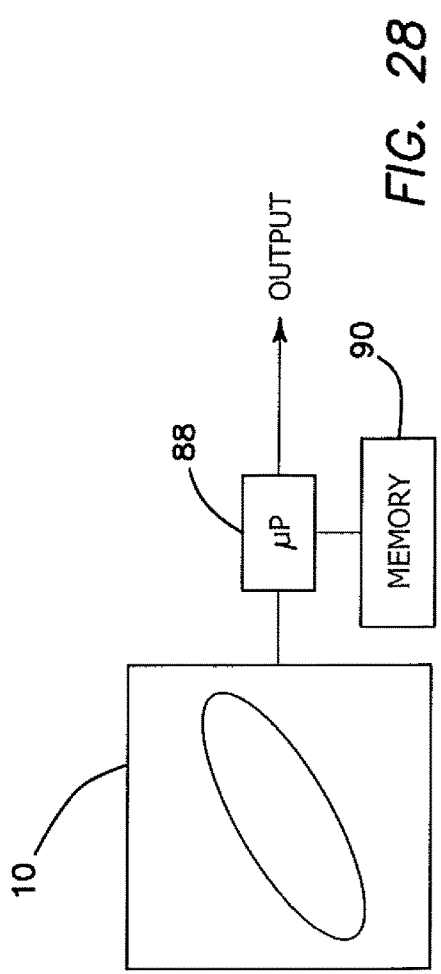
FIG. 28 is a simplified block diagram of a system in which the gyroscope is used as a measuring instrument.

In any one of the embodiments of FIGS. 1-27b gyroscope 10 is part of or constitutes a measuring instrument, where the resonant frequency dependence of the gyroscope 10 on a target parameter is sensed, measured and the functional dependence of resonance frequency mapped onto a measure of the target parameter. For example, in the embodiment just above the gain or loss of weight of element 68 is mapped onto a measure of the amount of a specific pathogen in the environment. In such as case, as illustrated in FIG. 28 gyroscope 10 is coupled to a processor 88, which may be associated with a memory 90 where such a map is stored. While is some instances a measure may be produced directly from gyroscope 10 as a linear measure, it is contemplated that the mapping may be nonlinear and a more complicated functional relationship requiring a processor using a complex functional algorithm or a look-up table in order to yield a quantitative measure or even a qualitative measure relative to a predetermined threshold.

Figure 29:
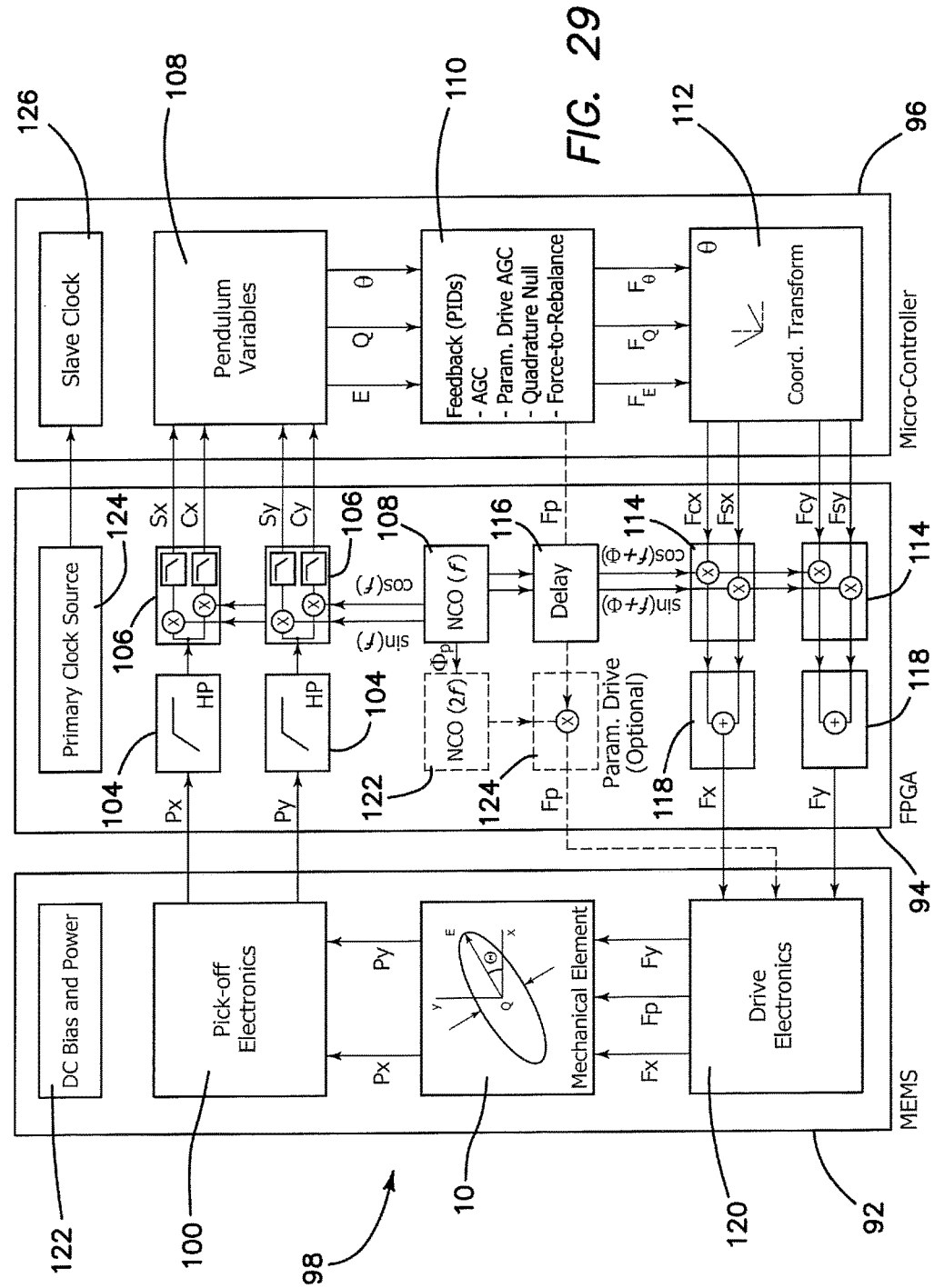
FIG. 29 is a block diagram of an embodiment of a controller circuit for use with the gyroscope.

In addition to the data processing circuitry of FIG. 28, another embodiment of a controller circuit for the operation of gyroscope 10 is illustrated in the block diagram of FIG. 29. A hybrid FPGA/micro-controller control system 98 comprised of MEMS subsystem 92, a field programmable gate array (FPGA) 94 and microcontroller 96 illustrated in FIG. 29 is shown for whole-angle gyro control. The control system 98 is responsible for driving the gyroscope 10 to constant amplitude, suppressing the quadrature error, and tracking/controlling the orientation of the precession pattern. System 98 is based on a phase locked loop (PLL) control principle that tracks the gyro motion at any arbitrary pattern angle as opposed to locking onto one of the primary gyro axes. Once the PLL lock is established, the FPGA 94 demodulates in-phase and in-quadrature signals from x and y channels from the gyro sensing electrodes using the pick off signals $P_x$ and $P_y$ from the pick-off electronics 100. MEMS subsystem includes a DC bias and power circuit 122 appropriately coupled to its internal components. $P_x$ and $P_y$ a high pass filter 104 and demodulated in mixers/lowpass filters 106 with the sine and cosine PLL frequency f from numerically controlled oscillator 102 to generate $c_x$, $c_y$, $s_x$ and $s_y$. The circuits of FPGA 94 are synchronized to a primary clock source 124, which is also coupled to and drives a slave clock 126 included in microprocessor subsystem 96. From these demodulated signals the slow moving variables: amplitude (E), quadrature error (Q), and pattern angle (θ) can be extracted in processor 108 using the equations $$E = c_x^2 + s_x^2 + c_y^2 + s_y^2,$$

$$Q = 2(c_x s_y - c_y s_x),$$

$$R = c_x^2 + s_x^2 + c_y^2 + s_y^2,$$

$$S = 2(c_x c_y + s_x s_y),$$

$$L = c_x^2 - s_x^2 + c_y^2 - s_y^2 + 2i(c_x s_x + c_y s_y),$$

where E is a measure of energy within the system and is used for amplitude stabilization. R and S are the projections of pattern angle on x and y axis. L is the phase of the gyroscope 10 relative to the PLL oscillation. The variables, $c_x$, $c_y$, $s_x$ and $s_y$ are the x and y axis amplitudes of the sine and cosine components of the gyroscope vibrations. Q is the measure of quadrature error, independent of drive orientation.

The imaginary component of L is a measure of phase error and used to establish a phase lock to the vibratory motion of the gyroscope 10. R and S can be used to find the orientation of the precession pattern using:

$$\theta = \frac{1}{2} \arctan\left(\frac{S}{R}\right).$$

A proportional, integrative and differential (PID) controller 110 acts on each of these variables. These are Amplitude Gain Control (AGC) acting on E, quadrature null acting on Q and force-to-rebalance (FRB) that controls pattern angle (θ). For the whole angle mechanization, FRB is disabled so that the standing wave is free to precess. Once the correct command voltages $F_E$, $F_Q$ and $F_B$ are established, a coordinate transform around θ is performed in processor 112 to align these signals to the standing wave pattern:

$$F_{cx} = F_E \cdot \cos(\theta) - F_\theta \cdot \sin(\theta),$$

$$F_{cy} = F_E \cdot \sin(\theta) + F_\theta \cdot \cos(\theta),$$

$$F_{sx} = -F_Q \cdot \sin(\theta),$$

$$F_{sy} = F_Q \cdot \cos(\theta),$$

This is followed by modulation of the command voltages at the PLL frequency in modulators 114. A set amount of phase delay from circuit 116 is also added during modulation so that the total phase of the feed-back system is a multiple of 360°. The command signals $F_{cx}$, $F_{cy}$, $F_{sx}$, and $F_{sy}$ are combined in adders 118 to generate drive signals $F_x$ and $F_y$ and applied to drive electronics 120 coupled to gyroscope 10.

Open loop parametric drive is typically unstable for nominal drive amplitudes, which causes the gyro amplitude to increase exponentially for a fixed parametric drive signal. For this reason a delayed secondary AGC signal, $F_p$, is modulated with the output of frequency doubler 122 at twice the resonant frequency in modulator 124 to control the parametric drive voltage coupled to drive electronics 120 to keep the gyro amplitude stable. This closed loop operation permits parametric drive of the gyro 10 at a wide range of drive amplitudes, outside the stability boundary of open loop parametric drive.

Typical gyro start up procedure begins with driving the gyro 10 to a preset amplitude using conventional (at resonance) drive. Once the PLL and AGC stabilize, the drive signal is disabled and immediately parametric drive AGC is enabled. This switch occurs within one clock cycle of the FPGA 94 and eliminates over-shoots in drive amplitude, which would otherwise occur while starting up the high-Q resonator.

Many alterations and modifications may be made by those having ordinary skill in the art without departing from the spirit and scope of the embodiments. For example, any one or more of the above embodiments may be combined with each other with appropriate modifications as might be needed to facilitate the combination. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A vibratory structure gyroscope comprising: an outer proof mass having a corresponding center of mass; an inner proof mass having a corresponding center of mass, where the corresponding centers of mass of the outer proof mass and the inner proof mass are approximately co-located; a plurality of electrodes coupled to the inner and outer proof masses; and a plurality of shuttles coupled to the inner and outer proof masses, where the outer proof mass and the inner proof mass are vibrated along a first axis of translational motion and sense Coriolis forces along a second axis of the translational motion in the presence of an angular velocity around a third axis, wherein the first axis and the second axis are in-plane and the third axis is out-of-plane; and wherein the plurality of shuttles are configured to permit vibrational movements of the inner and outer proof masses along the first axis and prevents vibrational movement of the inner and outer proof masses in any other direction.

2. The vibratory structure gyroscope of claim 1, where the inner proof mass is nested within the outer proof mass.

3. The vibratory structure gyroscope of claim 1, where the inner proof mass is in the shape of a rectangular prism and the outer proof mass is in the shape of a frame; where the inner proof mass is in the shape of a disk and outer mass is in the shape of a ring; where both the inner proof mass and the outer proof mass are in the shape of a frame; where both the inner and outer proof masses are in the shape of rings; or where the inner and outer proof masses are in the shape of multiple concentric rings coupled to each other through spokes.

4. The vibratory structure gyroscope of claim 1, further comprising: actuators which vibrate the inner and outer proof masses in anti-phase translational motion; or actuators which vibrate the inner and outer proof masses in a higher order Wineglass or Lame mode.

5. The vibratory structure gyroscope of claim 1, further comprising actuators which vibrate the inner and outer proof masses in synchronicity.

6. The vibratory structure gyroscope of claim 5, further comprising a flexural connection between inner and outer proof masses and where the synchronization of the vibratory motion is accomplished by the flexural connection between the inner and outer proof masses.

7. The vibratory structure gyroscope of claim 6, further comprising means for utilizing a closed loop algorithm acting on the inner and outer proof masses to synchronize the vibratory motion.

8. The vibratory structure gyroscope of claim 1, further comprising: means for vibrating the inner and outer proof masses in an anti-phase linear vibratory motion with approximately equal inertial forces, such that a net force generated due to the vibratory motion is approximately zero; means for vibrating the inner and outer proof masses in an in-phase linear vibratory motion such that a net force generated due to the vibratory motion is non-zero; means for vibrating the inner and outer proof masses in an anti-phase torsional vibratory motion with approximately equal rotational inertia, such that a net torque generated due to the vibratory motion is approximately zero; means for vibrating the inner and outer proof masses in an in-phase torsional vibratory motion such that a net torque generated due to the vibratory motion is non-zero; means for sensing a linear motion of the inner and outer proof masses along x, y or z axis to measure angular velocity of the gyroscope along the x, y or z axis; means for sensing a linear motion along x, y or z axis to measure a linear acceleration of the gyroscope along the x, y or z axis; means for sensing a torsional motion along x, y or z axis of the inner and outer proof masses to measure an angular velocity of the gyroscope along the x, y or z axis; or means for sensing a torsional motion along x, y, z axis to generate a timing reference signal.

9. The vibratory structure gyroscope of claim 1, where the gyroscope is anchored to the inner proof mass; where the gyroscope is anchored to the outer proof mass; or where the gyroscope is anchored to both the inner and outer proof masses.

10. The vibratory structure gyroscope of claim 1, further comprising: parallel plate electrodes located on the inner and outer proof masses, which parallel plate electrodes are used to drive and sense a vibratory motion of the inner and outer proof masses through electrostatic transduction; or comb finger electrodes located on the inner and outer proof masses, which comb finger electrodes are used to drive and sense a vibratory motion through electrostatic transduction.

11. The vibratory structure gyroscope of claim 1, further comprising a pressure membrane and a mechanical element coupled to the pressure membrane to measure pressure in addition to inertial forces.

12. The vibratory structure gyroscope of claim 11, further comprising a source of current coupled to the mechanical element making the mechanical element sensitive to magnetic fields, changing vibration amplitude, phase or frequency of the inner and outer proof masses in the presence of magnetic fields.

* * * * *